(12) United States Patent
Korchev et al.

(10) Patent No.: US 9,267,048 B2
(45) Date of Patent: Feb. 23, 2016

(54) METHODS TO CONTROL ELECTRICAL RESISTIVITY IN FILLER-POLYMER COMPOSITIONS AND PRODUCTS RELATED THERETO

(71) Applicant: Cabot Corporation, Boston, MA (US)

(72) Inventors: Andriy Korchev, Billerica, MA (US); Jeremy Huffman, Billerica, MA (US); Agathagelos Kyrlidis, Billerica, MA (US); Pavel Kossyrev, Billerica, MA (US); Eugene Step, Billerica, MA (US)

(73) Assignee: Cabot Corporation, Boston, MA (US)

( * ) Notice: Subject to any disclaimer, the term of this patent is extended or adjusted under 35 U.S.C. 154(b) by 338 days.

(21) Appl. No.: 13/912,258

(22) Filed: Jun. 7, 2013

(65) Prior Publication Data
US 2013/0273468 A1 Oct. 17, 2013

Related U.S. Application Data

(63) Continuation of application No. PCT/US2011/063689, filed on Dec. 7, 2011.

(60) Provisional application No. 61/422,877, filed on Dec. 14, 2010.

(51) Int. Cl.
| | |
|---|---|
| *C09D 11/52* | (2014.01) |
| *C08L 83/04* | (2006.01) |
| *C09J 9/02* | (2006.01) |
| *G03G 9/16* | (2006.01) |
| *H01B 1/04* | (2006.01) |
| *H01B 1/24* | (2006.01) |

(52) U.S. Cl.
CPC ............... *C09D 11/52* (2013.01); *C08L 83/04* (2013.01); *C09J 9/02* (2013.01); *G03G 9/16* (2013.01); *H01B 1/04* (2013.01); *H01B 1/24* (2013.01)

(58) Field of Classification Search
CPC ............ C08L 83/04; C09D 11/52; C09J 9/02; G03G 9/16; H01B 1/04; H01B 1/24; C08K 3/04; C08K 3/36; C08K 5/56
See application file for complete search history.

(56) References Cited

U.S. PATENT DOCUMENTS

| | | | |
|---|---|---|---|
| 2,833,736 | A | 5/1958 | Glaser |
| 3,607,813 | A | 9/1971 | Purcell et al. |
| 4,104,833 | A | 8/1978 | Glowacki |
| 4,308,061 | A | 12/1981 | Inoue |
| 4,692,481 | A | 9/1987 | Kelly |
| 4,770,706 | A | 9/1988 | Pietsch |
| 5,026,755 | A | 6/1991 | Catena et al. |
| 5,051,464 | A | 9/1991 | Johnson et al. |
| 5,204,404 | A | 4/1993 | Konsza |
| 5,266,361 | A | 11/1993 | Poth et al. |
| 5,266,406 | A | 11/1993 | Den Hartog et al. |
| 5,275,900 | A | 1/1994 | Martins et al. |
| 5,278,018 | A | 1/1994 | Hyland |
| 5,314,945 | A | 5/1994 | Nickle |
| 5,319,044 | A | 6/1994 | Jung et al. |
| 5,356,973 | A | 10/1994 | Hartman |
| 5,484,575 | A | 1/1996 | Steenackers |
| 5,510,221 | A | 4/1996 | Cortash et al. |
| 5,571,654 | A | 11/1996 | Ong |
| 5,622,557 | A | 4/1997 | Belmont et al. |
| 5,747,562 | A | 5/1998 | Adams et al. |
| 5,749,950 | A | 5/1998 | Adams et al. |
| 5,830,930 | A | 11/1998 | Francis et al. |
| 5,859,120 | A | 1/1999 | Freund et al. |
| 5,863,323 | A | 1/1999 | Belmont et al. |
| 5,869,550 | A | 2/1999 | Mahmud et al. |
| 5,877,238 | A | 3/1999 | Francis et al. |
| 5,904,762 | A | 5/1999 | Mahmud et al. |
| 5,919,841 | A | 7/1999 | Francis et al. |
| 5,948,835 | A | 9/1999 | Francis et al. |
| 5,977,213 | A | 11/1999 | Mahmud et al. |
| 5,977,238 | A | 11/1999 | Labauze |
| 6,008,272 | A | 12/1999 | Francis et al. |
| 6,028,137 | A | 2/2000 | Belmont et al. |
| 6,057,387 | A | 5/2000 | Mahmud et al. |
| 6,068,688 | A * | 5/2000 | Whitehouse et al. ...... 106/31.65 |
| 6,071,995 | A | 6/2000 | Labauze |
| 6,169,129 | B1 | 1/2001 | Mahmud et al. |
| 6,172,154 | B1 | 1/2001 | Brown et al. |
| 6,191,184 | B1 | 2/2001 | Suzuki et al. |
| 6,211,279 | B1 | 4/2001 | Mahmud et al. |
| 6,323,273 | B1 | 11/2001 | Mahmud et al. |
| 6,331,586 | B1 | 12/2001 | Thielen et al. |
| 6,364,944 | B1 | 4/2002 | Mahmud et al. |

(Continued)

FOREIGN PATENT DOCUMENTS

| | | |
|---|---|---|
| EP | 0459464 B1 | 4/1996 |
| EP | 0720066 A1 | 7/1996 |

(Continued)

OTHER PUBLICATIONS

Wang et al, Carbon-silica dual phase filler, a new generation reinforcng agent for rubber: Part VIII. surface characterization by IGC, Rubber Cmistry and Technology, Sep./Oct. 2000 vol. 73, Issue 4, pp. 666-677.*
Wang et al, Carbon-silica dual-phase filler, a new-generation reinforcing agent for rubber. Part VI. Time-temperature superposition of dynamic properties of carbon-silica-dual-phase-filler-filled vulcanizates, vol. 38, Issue 9, pp. 124-1249, May 2000.*
English language translation of Jp 2000-351903, pp. 1-10 (2000).*
Taiwan Office Action and search report dated Jan. 29, 2015 in corresponding Taiwan Patent Application No. 103109156 (with English summary) (16 pages).
Calame, "Evolution of Davidson-Cole relaxation behavior in random conductor-insulator composites," J. Appl. Physics, 94(9), 5945-5957 (2003).
Wang et al., "New Generation Carbon-Silica Dual Phase Filler Part I. Characterization and Application to Passenger Tire," Rubber Chemistry and Technology, 75, 247-263 (2001).
Zhang et al., "Carbon-Silica Dual Phase Filler Application to Passenger Tread Compounds," Rubber World, 43-55 (Apr. 2002).
International Preliminary Report on Patentability for International Application No. PCT/US2011/063689, mailed on Jun. 27, 2013.
Korean Office Action dated Sep. 15, 2014 in corresponding Korean Patent Application No. 10-2013-7018298 (English translation only 8 pages).

(Continued)

*Primary Examiner* — Alexander Kollias

(57) ABSTRACT

Methods to control electrical resistivity in filler-polymer compositions are described using dual phase fillers. Polymer compositions containing the dual phase fillers are further described.

4 Claims, 15 Drawing Sheets

(56) References Cited

U.S. PATENT DOCUMENTS

| | | |
|---|---|---|
| 6,391,274 B1 | 5/2002 | Vogler et al. |
| 6,448,309 B2 | 9/2002 | Mahmud et al. |
| 6,458,882 B1 | 10/2002 | Pyle et al. |
| 6,469,089 B2 | 10/2002 | Wang et al. |
| 6,476,115 B1 | 11/2002 | Wideman |
| 6,534,569 B2 | 3/2003 | Mahmud et al. |
| 6,686,409 B2 | 2/2004 | Mahmud et al. |
| 6,709,506 B2 | 3/2004 | Mahmud et al. |
| 6,929,783 B2 | 8/2005 | Chung et al. |
| 7,199,176 B2 | 4/2007 | Mahmud et al. |
| 7,655,372 B2 | 2/2010 | Step et al. |
| 7,776,602 B2 | 8/2010 | Brown et al. |
| 7,776,603 B2 | 8/2010 | Brown et al. |
| 7,776,604 B2 | 8/2010 | Brown et al. |
| 2002/0027110 A1 | 3/2002 | Belmont et al. |
| 2003/0138733 A1 | 7/2003 | Sachdev et al. |
| 2005/0203202 A1 | 9/2005 | Weine Ramsey |
| 2006/0084751 A1 | 4/2006 | Step et al. |
| 2008/0159947 A1 | 7/2008 | Green et al. |
| 2010/0069568 A1 | 3/2010 | Kiesekamp |
| 2011/0005063 A1 | 1/2011 | Lee et al. |
| 2013/0158164 A1* | 6/2013 | Morris .............. B29B 7/465 523/351 |
| 2013/0165560 A1* | 6/2013 | Belmont ............ C08K 9/12 524/105 |
| 2013/0273468 A1 | 10/2013 | Korchev et al. |

FOREIGN PATENT DOCUMENTS

| | | | |
|---|---|---|---|
| EP | 2495285 A1 | 9/2012 | |
| JP | H10-316800 A | 12/1998 | |
| JP | H11-080514 A | 3/1999 | |
| JP | 2000-351903 * | 12/2000 | ............ C08I 101/12 |
| JP | 2001-089598 A | 4/2001 | |
| JP | 2001139730 A | 5/2001 | |
| JP | 2002-055520 A | 2/2002 | |
| JP | 2002-121308 A | 4/2002 | |
| JP | 2011-116955 A | 6/2011 | |
| WO | WO 2012/082484 A2 | 6/2012 | |

OTHER PUBLICATIONS

Japanese Office Action dated Aug. 8, 2014 in corresponding Japanese Patent Application No. 2013-544561 (English translation only) (4 pages).

Wang, et al., "Carbon-Silica Dual Phase Filler, a New Generation Reinforcing Agent for Rubber", KGK Kautschuk Gummi Kunststoffe 51., May 1998, pp. 348-360, XP-000766427.

Abstract only of JP2000-351903, Published Dec. 19, 2000. Applicant—Tokai Rubber Ind. Ltd.

* cited by examiner

METHODS TO CONTROL ELECTRICAL RESISTIVITY IN FILLER-POLYMER COMPOSITIONS AND PRODUCTS RELATED THERETO

This application is a continuation of International Patent Application No. PCT/US2011/063689, filed on Dec. 7, 2011, which, in turn, claims the benefit under 35 U.S.C. §119(e) of prior U.S. Provisional Patent Application No. 61/422,877, filed Dec. 14, 2010, which is incorporated in its entirety by reference herein.

BACKGROUND OF THE INVENTION

The present invention relates to fillers and fillers in filler-polymer compositions. The present invention further relates to filler-polymer compositions with controlled electrical resistivity and methods to control resistivity in filler-polymer compositions.

In making filler-polymer compositions, there is a desire to have certain electrical resistivity, such as volume resistivity and/or surface resistivity, in the filler-polymer composition for various uses. The desired range of electrical volume resistivity depends on a particular application and, for example, can be in the range of from $10^1$ to $10^{18}$ Ohm*cm. A typical volume resistivity value for some commercial polymers is in the range of from $10^{12}$ to $10^{18}$ Ohm*cm. Conductive filler, such as carbon black, is frequently added to lower electrical resistivity of particle-polymer composition, also referred to as a composite. A sharp change in resistivity of the composite happens when the concentration of carbon particles reaches a critical value at which continuous conductive paths are formed.

The resistivity of composites can be affected by the chemical functionalization of the carbon black, for instance, by use of diazonium chemistry, where an alkyl-containing or aromatic-containing group is attached onto the carbon black. U.S. Published Patent Application No. 2006/0084751 A1 provides some examples of certain types of chemical functionalizations of the carbon surface via diazonium chemistry with non-polymeric organic groups. While this chemical functionalization has been quite useful and an important advancement in filler-polymer compositions, the chemical functionalization of carbon black can have a disadvantage in that the chemical groups attached onto the surface of the carbon black are sensitive to high temperatures. For instance, at temperatures above 150° C., the chemical groups attached onto the carbon black may be destroyed, which can lead to the loss of resistivity performance. Since some filler-polymer compositions are made or are preferably made in high temperature processing or subjected to high temperatures in post-processing, it would be helpful to have alternative solutions to controlling electrical resistivity in filler-polymer compositions which are less sensitive to high temperature processing.

Further, it would also be desirable to have a filler which can permit control of electrical resistivity in a polymer composition. Such fillers would have benefits in various applications, such as the ones exemplified below:

One application is with electrophotographic composites, which can benefit from the fillers that can tune polymer film surface resistivity to, for instance, $10^6$-$10^9$ Ohm/sq range. Such an intermediate range of resistivity for electrophotographic composites (rolls and belts) can be important for proper operation, specifically to transfer charged toner particles and develop images. Generally, such composites want to avoid being too conductive or too resistive.

Another example is in electronic industrial formulations (such as black inks, adhesives, etc), where the color and high electrical resistivity can be important. There is a need for high resistivity carbon blacks to insure proper operation of electronic parts and avoid short circuits when carbon black particles are not perfectly dispersed in the formulations.

One of the major uses of carbon black particles is in reinforcing rubber polymers (tire applications). Typically, a reinforced polymer composite (for example, a tire) has about 30 wt % of carbon black. Such a high concentration of carbon black particles leads to electrical percolation of the composite, which is used in certain rubber applications to dissipate the electrostatic charges. However, there are applications that can benefit from reinforced polymers that are also electrically resistive, such as applications related to insulative rubber composites, insulative polymer composites, various insulative adhesive, and sealant formulations.

Thus, it would be desirable to control electrical resistivity in filler-polymer compositions, including the more difficult regions, as shown in FIG. 1, regions 1 and 2. It would also be desirable to have a filler which can permit control of electrical resistivity in a filler-polymer composition and which is more dispersible in certain types of chemistries, such as silicone-type chemistries.

Accordingly, there is a need to overcome the disadvantages mentioned above and to provide methods to control electrical resistivity in filler-polymer compositions in order to achieve a desired resistivity range, particularly methods which are not dependent on the chemical functionalization of conductive filler particles alone or at all. Further, there is a need to provide filler-polymer compositions with controlled electrical resistivity that are more dispersible in various types of polymer compositions, including silicone polymer compositions.

Carbon black is frequently added to polymers to improve polymer stability against the damaging UV and/or IR light. At the same time, the electrical resistivity of such a composite is affected, which is highly undesirable for certain applications. Accordingly, there is a need to provide methods to control electrical resistivity in such a manner that one is able to maintain the electrical resistivity level of the original polymer at any loading of an optically dense carbon type filler.

SUMMARY OF THE PRESENT INVENTION

A feature of the present invention is to provide methods to control electrical resistivity in filler-polymer compositions.

A further feature of the present invention is to provide methods to control electrical resistivity in filler-polymer compositions that require elevated temperature for preparation or post-processing. A further feature of the present invention is to provide a polymer composition containing at least one silicone polymer, where the filler used is dispersible in a uniform manner in the polymer composition.

An additional feature of the present invention is to provide a filler-polymer composition which permits the use of a platinum curing catalyst.

A further feature of the present invention is to provide a filler-polymer composition, wherein the electrical resistivity is consistent across a large range of filler loadings.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to control electrical resistivity in a filler-polymer composition. The method can include combining at least one polymer with at least one filler. The filler comprises one or more of the following:

a) a controlled amount of a dual phase filler having a silica phase and a carbon phase, or b) a dual phase filler having a silica phase and a carbon phase, wherein said silica phase is a controlled surface coverage amount of the silica phase, or c) a dual phase filler having a silica phase and a carbon phase, wherein the dual phase filler has a controlled morphology. The filler can have any particle size. For instance, the dual phase filler can be aggregates with an average aggregate size of less than 250 nm.

The present invention further relates to a polymer composition having at least one silicone polymer and a dual phase filler having a silica phase and a carbon phase. The dual phase filler has an exposed outer surface area and the silica phase comprises from about 10% to about 90% by surface area of the exposed outer surface area.

Also, the present invention relates to a polymer composition having at least one polymer and at least one dual phase filler comprising a silica phase and a carbon phase, wherein the dual phase filler can have any sulfur amount, such as about 2.5 wt % or less or 10000 ppm or less. This is especially possible when the silica phase has over 50% surface coverage of the dual phase filler. The polymer composition further can optionally contain at least one Pt curing catalyst and can be cured.

Also, the present invention relates to a polymer composition having at least one polymer and at least one dual phase filler comprising a silica phase and a carbon phase, wherein the dual phase filler has a total sulfur amount of 500 ppm or less. The polymer composition further can optionally contain at least one Pt curing catalyst and can be cured.

In addition, the present invention relates to a polymer composition having at least one polymer and at least one dual phase filler having an exposed outer surface area, wherein the dual phase filler has a OAN of about 200 cc/100 g filler or less, a silica content of 30 wt % to 90 wt % based on the weight of the dual phase filler, and the silica phase comprises from about 10% to about 90% by surface area of the exposed outer surface area.

The present invention further relates to a polymer composition comprising at least one polymer and at least one filler, for instance a filler having an OAN number of at least about 65 cc/100 g filler, wherein the electrical resistivity of the filler-polymer composition changes an order of magnitude of 2 or less, at a loading of from 5 to 35 wt %, based on the weight percent of the overall filler-polymer composition. The filler can be or include a dual phase filler having a silica phase and a carbon phase.

Also, the present invention relates to products or articles containing one or more of the filler-polymer compositions of the present invention. The product or article can be or include a toner, an electrophoretic device, an ink, an adhesive, a sealant, an electrophotographic composite, an insulative rubber part, and the like.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

BRIEF DESCRIPTION OF DRAWINGS

FIG. 1 shows a schematic electrical resistivity (percolation) curve for a polymer composite with conductive particles. Shown with the boxes are areas that difficult to achieve or control with the conductive carbon black particles.

DETAILED DESCRIPTION OF THE PRESENT INVENTION

Figure 1:
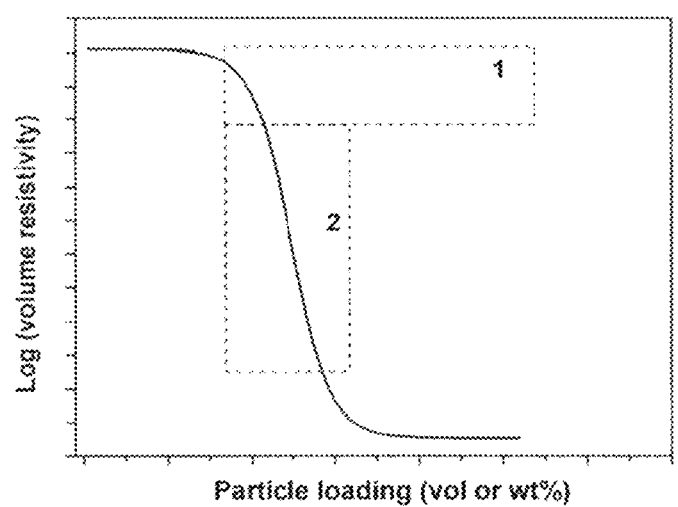
FIG. 1 is a graph of log volume resistivity versus particle concentration showing an example of a percolation curve for a polymer composite, and regions 1 and 2 reflect areas difficult to achieve or control prior to the present invention.

The present invention relates to methods to control electrical resistivity in filler-polymer compositions. The present invention further relates to filler-polymer compositions with controlled electrical resistivity. The present invention further relates to filler-polymer compositions with intermediate resistivity, such as from $10^6$ to $10^{10}$ Ohm-cm. In the present invention, the electrical resistivity can be controlled such that the electrical resistivity of the filler-polymer composition can be $10^4$ to $10^{16}$ Ohm-cm, such as from $10^5$ to $10^{15}$ Ohm-cm, or from $10^6$ to $10^{14}$ Ohm-cm, or other controlled amounts.

With regard to one aspect of the present invention, the present invention relates to a method to control electrical resistivity in a filler-polymer composition. The electrical resistivity can be, for instance, volume resistivity and/or surface resistivity. The electrical resistivity is with respect to the composition that contains the filler and polymer.

In the method to control electrical resistivity, the method involves combining at least one polymer with at least one filler to form a filler-polymer mixture. In combining the at least one polymer with at least one filler, the method includes selecting/choosing/using at least one filler based on one or more of the following characteristics/features/parameters of the filler that is used to form the filler-polymer composition:

a) a controlled amount (e.g., loading level) of a dual phase filler having a silica phase and a carbon phase, or b) a dual phase filler having a silica phase and a carbon phase, wherein the silica phase is a controlled surface coverage amount of the silica phase, or c) a dual phase filler having a silica phase and a carbon phase, wherein the dual phase filler has a controlled morphology; or d) any combination of a), b), and c).

The present invention also relates to a method to control impedance, dielectric constant, and/or dielectric loss (tan δ) in a filler-polymer composition comprising:

combining at least one polymer with at least one filler, said filler comprising:

a) a controlled amount of a dual phase filler having a silica phase and a carbon phase, or b) a dual phase filler having a silica phase and a carbon phase, wherein said silica phase is a controlled surface coverage amount of the silica phase, or c) a dual phase filler having a silica phase and a carbon phase, wherein said dual phase filler has a controlled morphology; or d) any combination of a), b), and c).

With regard to the polymer used to form the filler-polymer composition, the polymer can be any one or more polymers. For instance, the polymer can be a thermoplastic or thermoset polymer. The polymer can be a silicone-containing polymer, for instance, polydimethyl siloxane, fluorosilicones, silicone-organic polymers, or silicone-organic hybrid polymers. The polymer can be any polymer, including natural products and synthetic products. The polymer can be any type of polymer, such as a random polymer, alternating polymer, graft polymer, block polymer, star-like polymer, and/or comb-like polymer. The polymer can also be one or more polyblends. The polymer can be an interpenetrating polymer network (IPN); simultaneous interpenetrating polymer network (SIN); or interpenetrating elastomeric network (IEN). The polymer can be thermoplastic or thermosettable.

Examples of polymers include, but are not limited to, olefin-containing, diene-containing and butene-containing polymers and copolymers. Particular examples include elastomers such as solution SBR, natural rubber, emulsion SBR, polybutadiene, polyisoprene, NBR, EPDM, EPM, isobutene elastomers, and their functionalized or modified derivatives or blends thereof.

Other examples of polymers include, but are not limited to, linear and non-linear polymers such as polyethylene, poly (vinylchloride), polyisobutylene, polystyrene, polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), cellulose acetate, ethylene-vinyl acetate, polyacrylonitrile, fluoropolymers and fluoroplastics, ionomeric polymers, polymers containing ketone group(s), polyketone, liquid crystal polymers, polyamide-imides, polyaryletherketone, polymers containing olefinic double bond(s) (such as polybutadiene, polydicyclopentadiene), polyolefin copolymers, polyphenylene oxides, polyurethanes, thermoplastic elastomers, polycarbonates, silicone polymers, alkyd, epoxy, unsaturated polyester, vinyl ester, urea-, melamine-, or phenol-formaldehyde resins, and the like. Preferably, the polymer is an acrylic polymer, a methacrylic polymer, or a styrenic polymer or silicone polymer, but would largely depend upon the intended application.

The polymers that form the filler-polymer composition can be pre-formed prior to combining with the one or more fillers, or one or more polymers can be formed in situ in the presence of one or more fillers. Any polymerization technique can be used to form the one or more polymers, such as emulsion polymerization, suspension polymerization, free radical polymerization, and the like.

Generally, any known polymer or combination of polymers especially used to form articles can benefit from the present invention with respect to controlling electrical resistivity and forming products with controlled resistivity.

The filler and polymer(s) can be combined using conventional techniques, such as blending, mixing, extruding, and the like.

Figure 2:
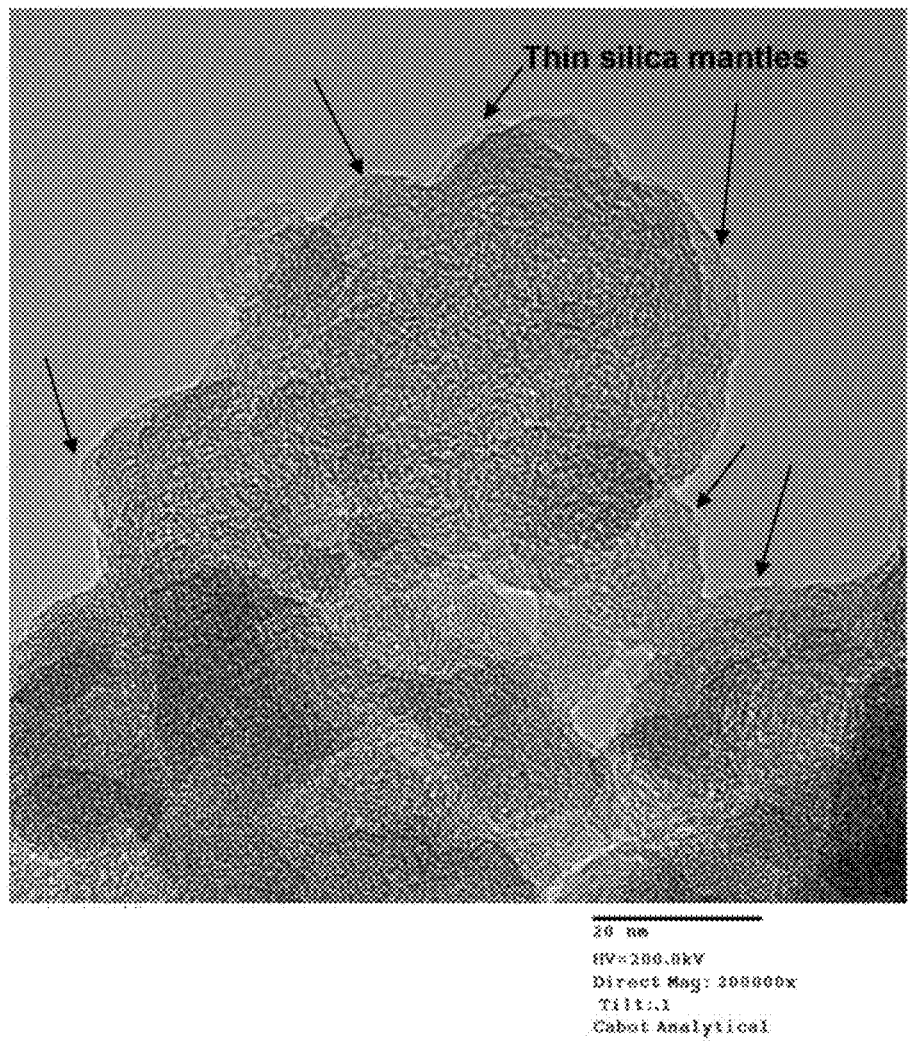
FIG. 2 is a TEM image of a dual phase filler. Surface silica mantles are shown with arrows.

With regard to the filler, at least one of the fillers used is a dual phase filler. The dual phase filler has a silica phase and a carbon phase. It is to be understood that the silica phase can be continuous or non-continuous, and the carbon phase can be continuous or non-continuous. Further, the term "dual phase filler" refers to the existence of a silica phase and a carbon phase, but it is to be understood that the silica phase can be multiple silica phases and/or the carbon phase can be multiple carbon phases. FIG. 2 is a high resolution TEM picture showing one example of a dual phase filler. The arrows in FIG. 2 point to examples of silica phase mantles or silica phase surface coverage of the filler.

In the dual phase filler, a silicon containing species, such as an oxide or carbide of silicon, for instance, a silica phase(s), is distributed through at least a portion of the filler as an intrinsic part of the filler. Similarly, the carbon phase(s) is distributed through at least a portion of the filler as an intrinsic part of the filler. The carbon phase is essentially a carbon black region(s) which exists as a carbon phase in the filler. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silica-coated carbon blacks. This is different from a dual phase filler.

The materials described herein as dual phase fillers are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the dual phase filler is an intrinsic part of the aggregate; it is distributed throughout at least a portion of the aggregate. It will be appreciated that the dual phase fillers are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783. Methods of making various types of dual phase fillers or silicon-treated carbon blacks and various compositions containing the same that can be used in the present application are described in U.S. Pat. Nos. 7,199,176; 6,709,506; 6,686,409; 6,534,569; 6,469,089; 6,448,309; 6,364,944; 6,323,273; 6,211,279; 6,169,129; 6,057,387; 6,028,137; 6,008,272; 5,977,213; 5,948,835; 5,919,841; 5,904,762; 5,877,238; 5,869,550; 5,863,323; 5,830,930; 5,749,950; 5,747,562; and 5,622,557, and U.S. Published Patent Application No. 2002/0027110, all incorporated in this application, in their entirety by reference herein.

The dual phase filler can include silicon-containing regions (e.g., silica regions) primarily at the aggregate surface of the filler, but still be part of the filler and/or the dual phase filler can include silicon-containing regions (e.g., silica regions) distributed throughout the filler. The dual phase filler can be oxidized. The dual phase filler can contain from about 0.1% to about 90% silicon (or silica) by weight or more, based on the weight of the dual phase filler. These amounts can be from about 0.5 wt % to 50 wt %, from 2 wt % to 45 wt %, from 5 wt % to 40 wt %, from 10 wt % to 45 wt %, from 15 wt % to 45 wt %, from 20 wt % to 50 wt %, from about 0.5 wt % to about 25 wt % or from about 2 wt % to about 15 wt % silicon, all based on the weight of the dual phase filler. Further exemplary amounts are provided below.

The dual phase filler, as an option, has at least part of the silica phase on the surface of the dual phase filler. In other words, the dual phase filler has an exposed outer surface and at least part of the silica phase, as an option, is present on the exposed surface of the dual phase filler. The amount of exposed surface coverage that is the silica phase can be varied. The amount of the silica phase present on the exposed surface area of the dual phase filler can be less than 100% by surface area. In other words, at least 0.1% by surface area of the exposed surface area of the dual phase filler can be a carbon phase. The amount of surface coverage of the silica phase on the exposed surface area of the dual phase filler can range, for instance, from 0.1% to 99.9%, 1% to 99%, 5% to 95%, 5% to 90%, 5% to 85%, 5% to 80%, 5% to 75%, 5% to 70%, 5% to 65%, 5% to 60%, 5% to 55%, 5% to 50% by surface area. The surface coverage amount of the silica phase that is part of the exposed surface area of the dual phase filler can be the following:

1%-5%; 5%-10%; 10%-15%; 15%-20%; 20%-25%; 25%-30%; 30%-35%; 35%-40%; 40%-45%; 45%-50%; 50%-55%; 55%-60%; 60%-65%; 65%-70%; 70%-75%; 75%-80%; 80%-85%; 85%-90%, wherein the percent is a reference to the percent surface area based on the total exposed surface area of the dual phase filler. A test that can be used to determine the amount of silica surface coverage is provided in the paper entitled "New Generation Carbon-Silica Dual Phase Filler Part I. Characterization And Application To Passenger Tire" Rubber Chemistry And Technology, Vol 75(2), pp. 247-263 (2002), incorporated in its entirety by reference herein.

The dual phase filler can have a variety of morphology with respect to, for instance, iodine number and/or OAN number. The OAN number can be at least 100 cc/100 g filler, such as from 100 to about 200 cc/100 g filler. The iodine number can be 150 mg/g or lower, such as from 5 to 150 mg/g. The dual phase filler can have an OAN of 140 cc/100 g filler or less. The dual phase filler can have an OAN of 60 to 140 cc/100 g filler. The dual phase filler can have an OAN of 141 to 200 cc/100 g filler. The dual phase filler can have an OAN of 200 cc/100 g filler or less. The OAN is measured based on ASTM D2414, incorporated in its entirety herein by reference.

As an option, the dual phase filler can have a primary particle size of 45 nm or less, such as from 5 nm to 45 nm, 7 nm to 40 nm, 8 nm to 40 nm, 10 nm to 35 nm, 5 nm to 30 nm, 5 nm to 25 nm, 5 nm to 20 nm, 5 nm to 15 nm, or 5 nm to 10 nm. This primary particle size can be the average primary particle size.

In the present invention, the dual phase filler comprises, consists essentially of, or consists of particles with an average aggregate size of less than 250 nm, such as 249 nm to 30 nm, 200 nm to 30 nm, 150 nm to 30 nm, 100 nm to 30 nm, and the like. The particles can be an aggregate(s) of fused primary particles or a complex cluster(s) of fused primary particles. The particles can be this aggregate or complex cluster and have one of these size range(s). As an option, the dual phase filler can comprise fused primary particles with an average aggregate size of less than 250 nm and a primary particle size of 45 nm or less. The primary particle size can be 45 nm or less, such as from 5 nm to 45 nm, 7 nm to 40 nm, 8 nm to 40 nm, 10 nm to 35 nm, 5 nm to 30 nm, 5 nm to 25 nm, 5 nm to 20 nm, 5 nm to 15 nm, or 5 nm to 10 nm. The primary particle size can be the average primary particle size.

As an option, the dual phase filler can have less than 1 wt % weight loss when subjected to a temperature of from 120° C. to 450° C. in air with a temperature ramp of 5 deg C. per minute The wt % loss can be from 0.1 wt % to 0.99 wt %, such as from 0.1 wt % to 0.95 wt % or from 0.5 to 0.9 wt %, based on the weight of the dual phase filler.

The dual phase filler can have a sulfur content. For instance, the total sulfur content can be 10000 ppm or less, 5000 ppm or less, 500 ppm or less, more preferably 300 ppm or less, for instance, 1 ppm to 300 ppm sulfur, 1 ppm to 100 ppm sulfur, 5 ppm to 75 ppm sulfur, 5 ppm to 50 ppm sulfur, 10 ppm to 75 ppm sulfur, 15 ppm to 100 ppm sulfur, 20 ppm to 150 ppm sulfur, and the like. The total sulfur content can be any amount, such as 2.5 wt % or less (based on weight of the filler), especially when the surface coverage of the silica phase is over 50% on the filler, such as over 60%, or over 70%, or over 80%, or over 90%, such as 51% to 99.9% surface coverage.

The dual phase filler can have a total silica phase amount in the dual phase filler that ranges from 1 wt % to 90 wt % or more, based on the weight of the dual phase filler. The silica phase can be present in an amount of from 5 wt % to 90 wt %, from 10 wt % to 85 wt %, from 15 wt % to 80 wt %, from 20 wt % to 75 wt %, from 25 wt % to 70 wt %, from 30 wt % to 65 wt %, from 35 wt % to 65 wt %, from 40 wt % to 85 wt %, from 50 wt % to 80 wt %, and the like.

Any combination of the various amounts of exposed surface area of silica phase with the various amounts of weight percent of silica phase in the overall dual phase filler is possible, as long as there is sufficient silica phase to achieve the desired surface area.

The remaining amount of the dual phase filler, if not silica phase, is generally the carbon phase. Trace amounts of other components and/or impurities typically found in carbon black feedstocks and/or silica feedstocks can be present in the dual phase filler.

As stated above, the dual phase filler used in the present invention can have a pre-determined amount of silica phase on the exposed surface of the dual phase filler. As stated above, the dual phase filler can have a morphology, especially with respect to structure, as shown by an iodine number or OAN number, as for instance provided herein.

Further, the amount of the dual phase filler in a filler-polymer composition can be any amount, such as 1 wt % to 50 wt % or more, based on the total weight of the filler-polymer composition. The loading levels of the dual phase filler can range from 5 wt % to 40 wt %, 5 wt % to 35 wt %, 10 wt % to 30 wt %, 15 wt % to 35 wt %, 20 wt % to 40 wt %, and the like, all based on the weight of the filler-polymer composition.

Any combination of these variables, loading levels, exposed surface area of silica phase, and morphology of dual phase filler can be used in the present invention.

The following correlations were developed/realized in the present invention, which have significance in providing the ability to control the electrical resistivity in a filler-polymer composition to obtain/provide the desired resistivity.

Figure 3:
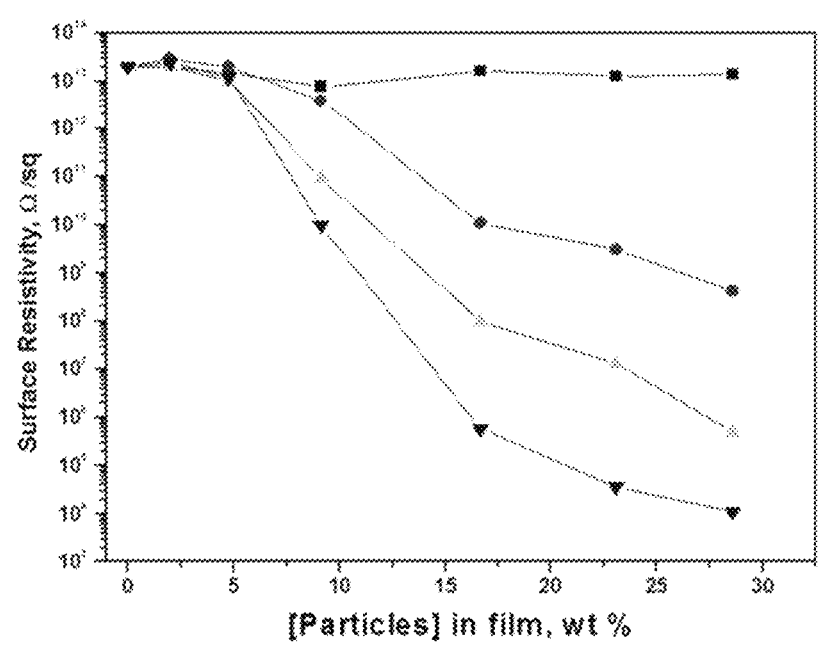
FIG. 3 is a graph showing surface resistivity for various filler-polymer compositions having various weight percents of filler and different silica phase surface coverage. Surface resistivity of polymer acrylic films are shown as a function of hybrid particle concentration and silica surface coverage: ■—85%, •—50%, ▲—30%, ▼—0%.

In particular, by controlling the amount of dual-phase filler (e.g., loading level) present in the filler-polymer composition, the electrical resistivity can be controlled. More specifically, when a higher filler loading is used, a lower volume resistivity in the filler-polymer composition is achieved. This, in an exemplary way, is shown in FIG. 3, wherein it can be seen that as the dual phase filler loading is increased from 0% to 30 wt % in the polymer-filler composition/composite, the surface resistivity of the composition/composite shown on Log scale decreased. It is noted that the various dual phase fillers, except for the filler identified as "0%," which was conventional pure carbon black with similar particle structure and surface area and used as a comparative, were various dual phase fillers with various amounts of silica phase on the surface (based on percent surface area). Thus, taking into account this relationship, this permits one to control the surface resistivity in a filler-polymer composition. If one wanted to achieve lower electrical resistivity, one would use, as one option, more dual phase filler with respect to loading level in the filler-polymer composition.

As an option, more than one filler can be used to achieve a particular electrical resistivity, which can be based on the amount of each filler and the resistivity that is contributed by that dual phase filler. Further, as an option, in any aspect of the present invention, additional filler that is not a dual phase filler, such as conventional carbon black, can be used. For instance, referring to FIG. 3, a combination of conventional carbon black with one or more of the dual phase fillers would achieve a desired electrical resistivity in the filler-polymer composition. The dual phase filler(s) mentioned herein can comprise 1 wt % or more, 5 wt % or more, 10 wt % or more, 20 wt % or more, 30 wt % or more, 40 wt % or more, 50 wt % or more, 60 wt % or more, 70 wt % or more, 80 wt % or more, 90 wt % or more, 95 wt % or more, or 100% of all filler (by weight percent of filler present) in the filler-polymer composition.

Figure 4:
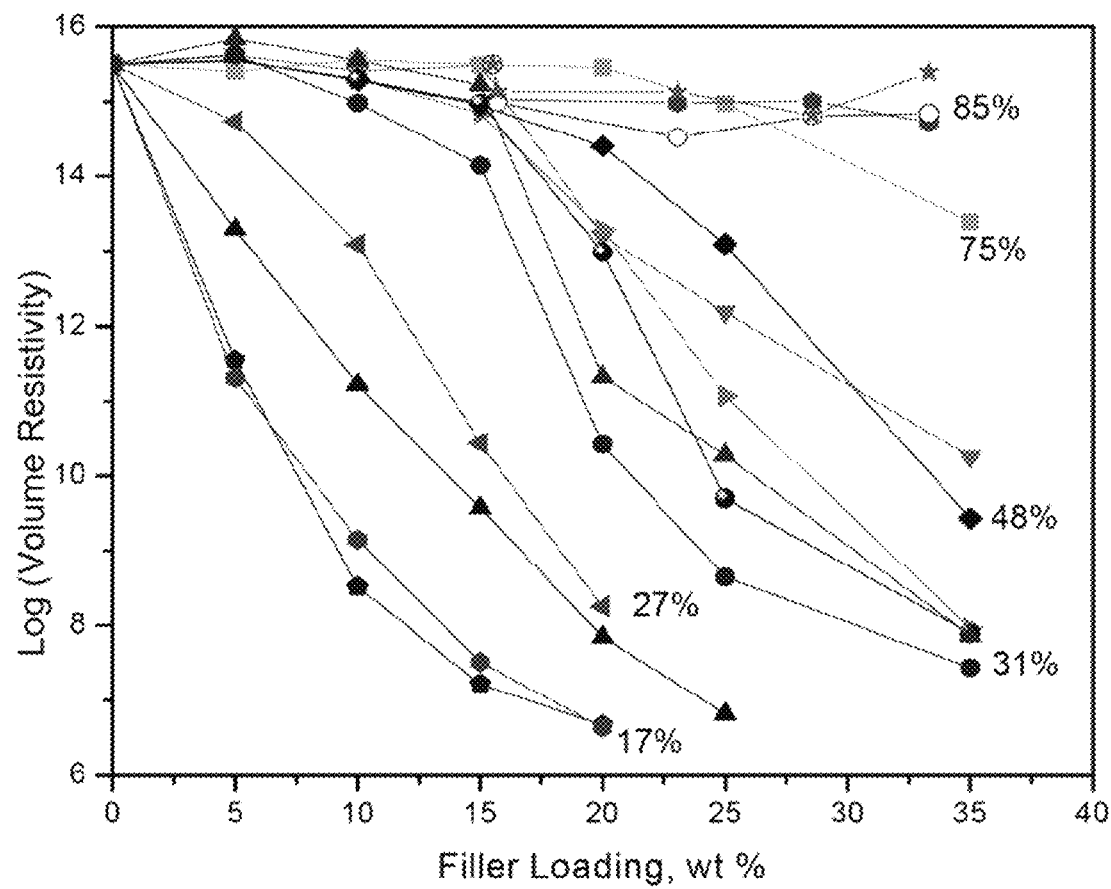
FIG. 4 is a graph showing the log (volume resistivity (Ohm/cm)) for various dual phase fillers at various particle loadings in the filler-polymer composition.
Figure 5:
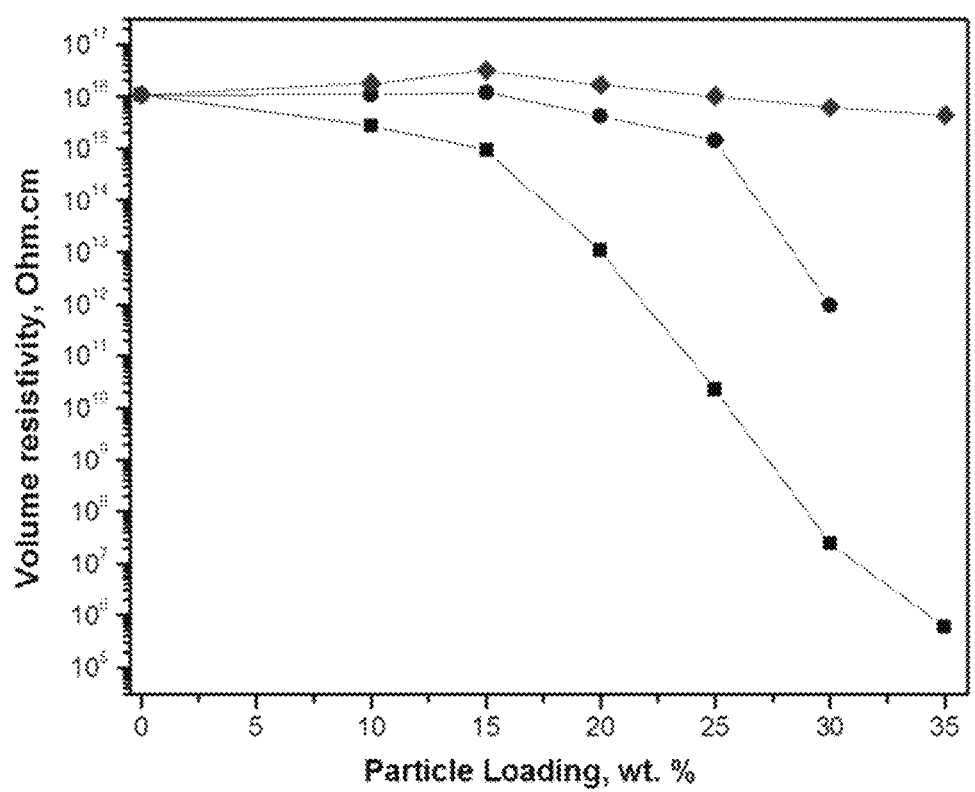
FIG. 5 is a graph showing the volume resistivity (Ohm/cm) of polystyrene films with various dual phase fillers at various particle loadings in the filler-polymer composition. Volume electrical resistivity of polystyrene films is shown as a function of hybrid particle concentration and surface coverage with silica: ■—30%, •—50%, ♦—85%.
Figure 6:
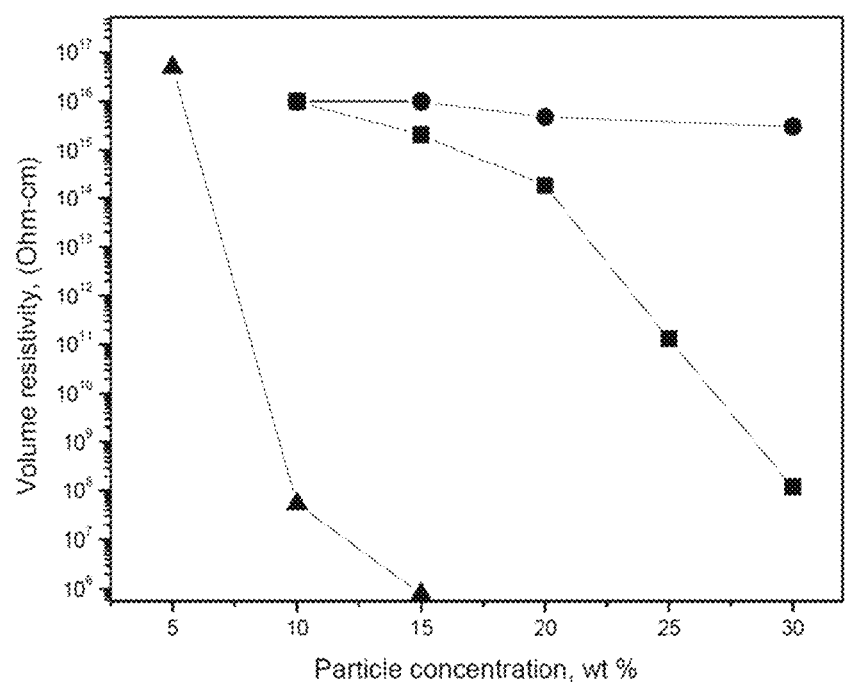
FIG. 6 is a graph showing the volume resistivity (Ohm/cm) of polycarbonate films with various dual phase fillers at various particle loadings in the filler-polymer composition. k Volume resistivity of polycarbonate films as a function of dual phase particle concentration and surface coverage with silica: ▲—0%, ■—50%, •—73%.

Further, the amount of surface coverage of the silica phase on the dual phase filler has the ability to change percolation behavior and therefore control electrical resistivity in the filler-polymer composition precisely to the desired resistivity range. More specifically, a higher controlled surface area amount (with respect to the silica phase) provides a higher electrical resistivity in the filler-polymer composition. For instance, referring to FIG. 3, a higher silica phase amount as the exposed surface, namely a higher percent of surface area that is silica phase on the surface of the dual phase filler, provides higher surface resistivity. As can be seen in FIGS. 3, 4, and 6, conventional carbon black, having a similar particle morphology and no silica phase, provided a sharper drop of resistivity of the composite and the lowest surface resistivity over a variety of loading levels. From a manufacturing point of view, such a sharp change of electrical resistivity with carbon black makes carbon black alone difficult or impractical to control resistivitity of the composite, for example, in the intermediate resistivity range. As shown in FIGS. 3-6, the different amounts of silica phase on the exposed surface area provided a convenient and practical way to control surface and/or volume resistivity of various polymer composites to the desired resistivity range. Realizing that the amount of exposed surface area of the dual phase filler that is a silica phase has the ability to control surface resistivity, this is also one way to control overall electrical resistivity in a filler-polymer composition.

Figure 8:
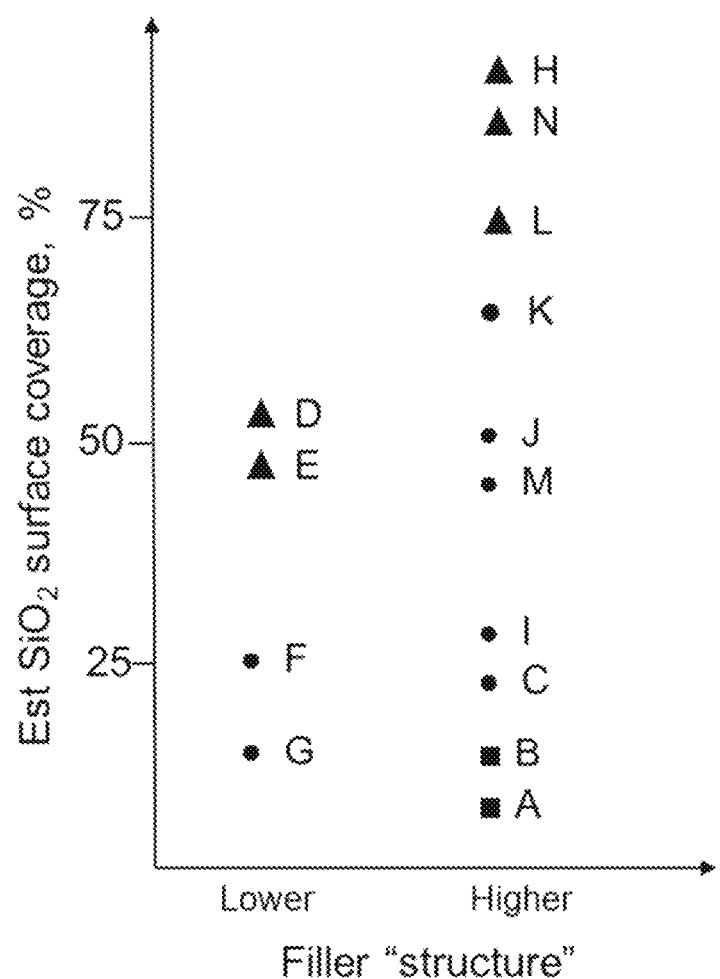
FIG. 8 is a graph showing silica surface coverage for the silica phase and corresponding filler structure. Comparison of dual particle fillers with different particle structure and silica surface coverage in their ability to control electrical resistivity of composites: ▲—High resistivity range; •—Intermediate resistivity range; ■—Low end of resistivity range

A third way to control electrical resistivity in a filler-polymer composition is by selecting/controlling the morphology of the dual phase filler. As shown in FIG. 8 and Table 1 (below), typically, a higher iodine number or higher OAN for the filler can contribute to a lower volume resistivity. This additional relationship can assist in controlling the desired electrical resistivity in a filler-polymer composition.

TABLE 1

Analytical characteristics of dual phase particles and recommended resistivity ranges

| Sample ID | SiO$_2$, wt % | I$_2$# | BET m$^2$/g | STSA, m$^2$/g | OAN, ml/100 g | SiO$_2$ Coverage, % | Target resistivity range |
|---|---|---|---|---|---|---|---|
| A | 14.45 | 171.4 | 212.4 | 171 | 172.4 | 10 | conductive |
| B | 8.0 | 120.9 | 156.8 | 135.0 | 176.8 | 17 | conductive |
| C | 11.4 | 111.4 | 160.0 | 133.6 | 182.4 | 24 | intermediate |
| D | 45.1 | 61.5 | 148.8 | 116.6 | 123.6 | 54 | high resistivity |
| E | 29.5 | 52.6 | 122.2 | 102.7 | 126.4 | 53 | high resistivity |
| F | 18.0 | 64.6 | 93.1 | 83.2 | 101.6 | 27 | intermediate |
| G | 12.9 | 87.9 | 111.4 | 99.3 | 87.7 | 17 | intermediate |
| H | 47.9 | 14.0 | 145.7 | 113.0 | 149.8 | 90 | high resistivity |
| I | 23.5 | 132.9 | 209.3 | 154.3 | 184.5 | 27 | intermediate |
| J | 37.0 | 65.1 | 164.2 | 119.4 | 206.7 | 54 | intermediate |
| K | 43.8 | 56.8 | 178.7 | 143.8 | 173.0 | 65 | intermediate |
| L | 47.4 | 34.9 | 144.9 | 110.6 | 187.5 | 73 | high resistivity |
| M | 31.3 | 77.4 | 169.5 | 126.7 | 207.3 | 50 | intermediate |
| N | 48.0 | 18.9 | 133.3 | 106.2 | 136.4 | 85 | high resistivity |

Figure 14:
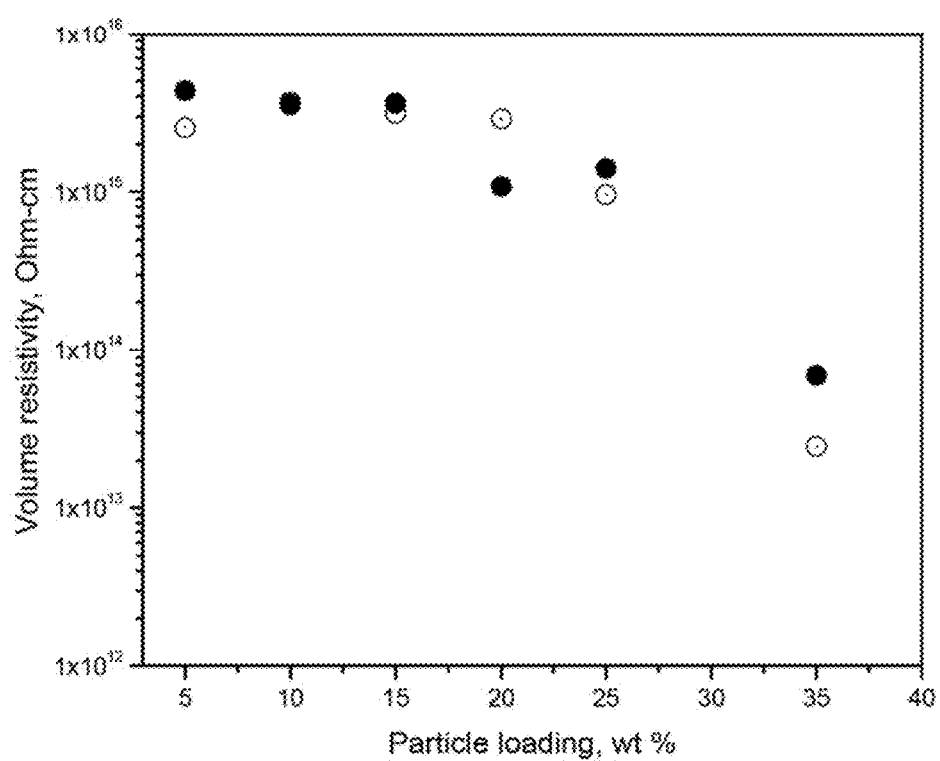
FIG. 14 is a graph showing the volume resistivity for an acrylic polymer film as a function of dual phase particle concentration for two types of dual phase fillers. Volume resistivity of acrylic polymer film as a function of dual phase particle concentration are shown: sample D (•) and sample L (o).

For instance, as seen from FIG. 8, dual phase particles with higher structure require higher degree of surface coverage with silica to show similar electrical performance. The Example, shown on FIG. 14, depicts volume resistivity of acrylic films comprising dual phase filler particles with substantially different level of silica surface coverage and level of particle structure. As seen, the electrical performance of the films with higher silica coverage and higher structure particles can be nearly matched with the dual phase particles that had lower structure and lower silica coverage. Therefore, one can control electrical properties of polymer composites by selecting dual phase particles with appropriate silica coverage (see FIG. 8) or by selecting dual phase particles with the desired structure or by combination of both. Concentration of dual phase particles as a handle to adjust electrical resistivity has been discussed above. As noted above, any one, any two, or all three of these characteristics/features/parameters can be used to "dial in" a desired electrical resistivity in a filler-polymer composition. By using these features, one is able to precisely achieve the desired electrical resistivity in the filler-polymer composition.

Figure 11:
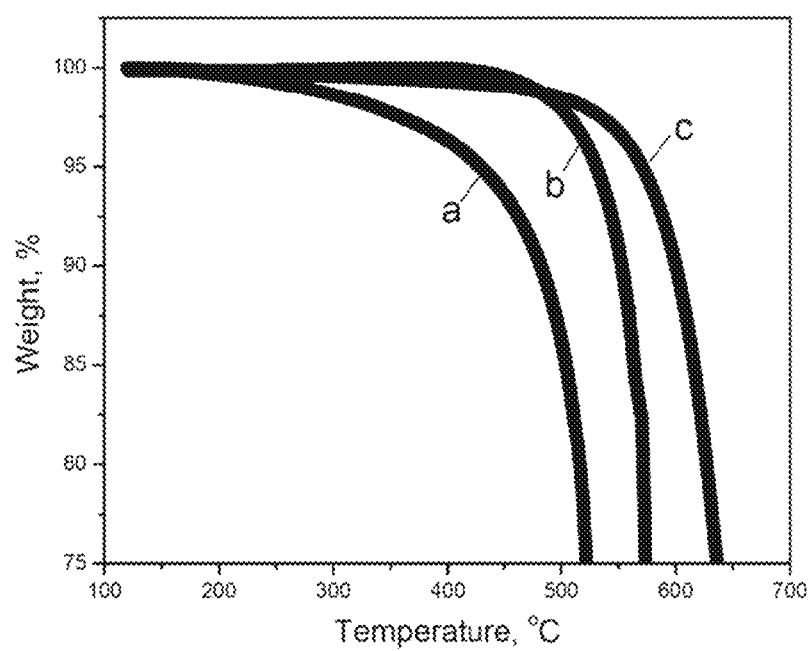
FIG. 11 is a graph showing a thermogravimetric analysis of a dual phase filler having 85% silica phase coverage and compared to oxidized carbon black and carbon black. Thermogravimetric curves are shown of particle weight loss on air (the first 25% weight loss is shown): a—oxidized carbon black; b—carbon black; c—dual phase particles (sample N).

The present invention is especially useful in polymer compositions that require a processing or post-processing temperature of 150° C. or more, 200° C. or more, or 300° C. or more, or 400° C. or more, or 500° C. or more. Thermogravimetric analysis of a dual phase filler in the presence of air is shown in FIG. 11. There was no appreciable weight loss in a dual phase filler up to 500° C. On the contrary, it is well known that oxidized carbon blacks and carbon blacks with chemically attached or physically adsorbed organic or polymeric moieties start losing attached or adsorb functional groups at temperatures as low as 150° C. or less. As a result, any benefits that such chemically attached or adsorb groups could bring to control resistivity of filler-polymer composites (or other performance parameters) are not realized or not fully realized once the filler-polymer formulation or composite is subjected to elevated temperatures. The present invention overcomes this disadvantage by using/selecting appropriate dual phase filler, and achieves a desired and/or consistent electrical resistivity, even after subjecting the filler containing polymer formulation or filler-polymer composite to temperatures of 150° C. (or more) and/or subjecting the composition up to a temperature where polymer degradation occurs. Examples of polymers, e.g., thermoplastic, thermoset components, have been described earlier and apply equally here, but are not limited to those mentioned. The choice of polymer(s) would largely depend upon the intended application.

Accordingly, the present invention includes a polymer composition as described herein (above or below), wherein the electrical resistivity of the filler-polymer composition is maintained upon thermal processing or post-processing of the filler-polymer composition at temperatures up to the thermal stability of the polymer(s) present in the filler-polymer composition. The electrical resistivity of the filler-polymer composition can be maintained upon thermal processing or post-processing of the filler-polymer composition at temperatures up to at least 500° C.

The present invention can be especially useful in a polymer composition that comprises at least one silicone polymer and at least one dual phase filler of the present invention. A particular polymer composition that is useful has a dual phase filler with an exposed outer surface area, wherein the silica phase comprises from about 10% to about 90% by surface area of the exposed outer surface area. The exposed surface area can be from 20% to 85% by surface area, from 30% to 80% by surface area, from 30% to 70% by surface area of the exposed outer surface area of the dual phase filler. The silicone polymer can be, for instance, polydimethyl siloxane, polydiorganisiloxanes, polysiloxanes, silicone resins and silicone rubber compositions.

Figure 7:
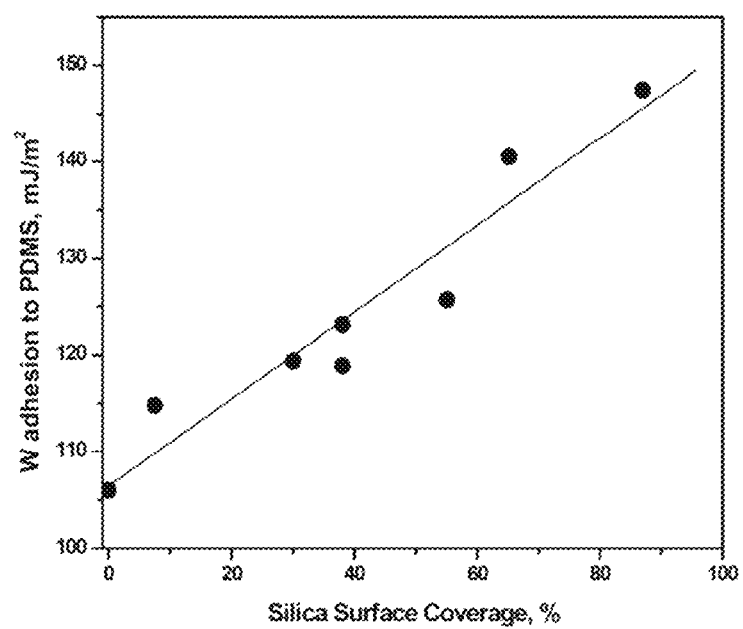
FIG. 7 is a graph showing the W adhesion to polydimethyl siloxane with respect to various dual phase fillers with different amounts of silica surface coverage as the silica phase in the dual phase filler.

The polymer composition comprising at least one silicone polymer and a dual phase filler can have a work of adhesion of particle to resin of 110 mJ/m$^2$ or higher, such as 120 to 150 mJ/m$^2$. As shown in FIG. 7, as the exposed outer surface area increases with respect to the silica phase, the work of adhesion of the particle to resin (or polymer) increases, which indicates that the dual phase filler has positive interactions with silicone polymers and therefore has better wetting and dispersing characteristics. Thus, a higher exposed surface area that is silica permits an easier preparation of the dispersion of the dual phase filler in the certain silicone polymers in order to form the filler-polymer composition. The manner in which the work of adhesion can be measured and other details can be found, for instance, as shown in U.S. Pat. Nos. 7,776, 604; 7,776,603; and 7,776,602. These patents also have cited articles (within the patent and on the patent cover pages as listed documents) with regard to evaluating the work of adhesion, and all of these references are also incorporated in their entirety by reference herein.

Figure 9:
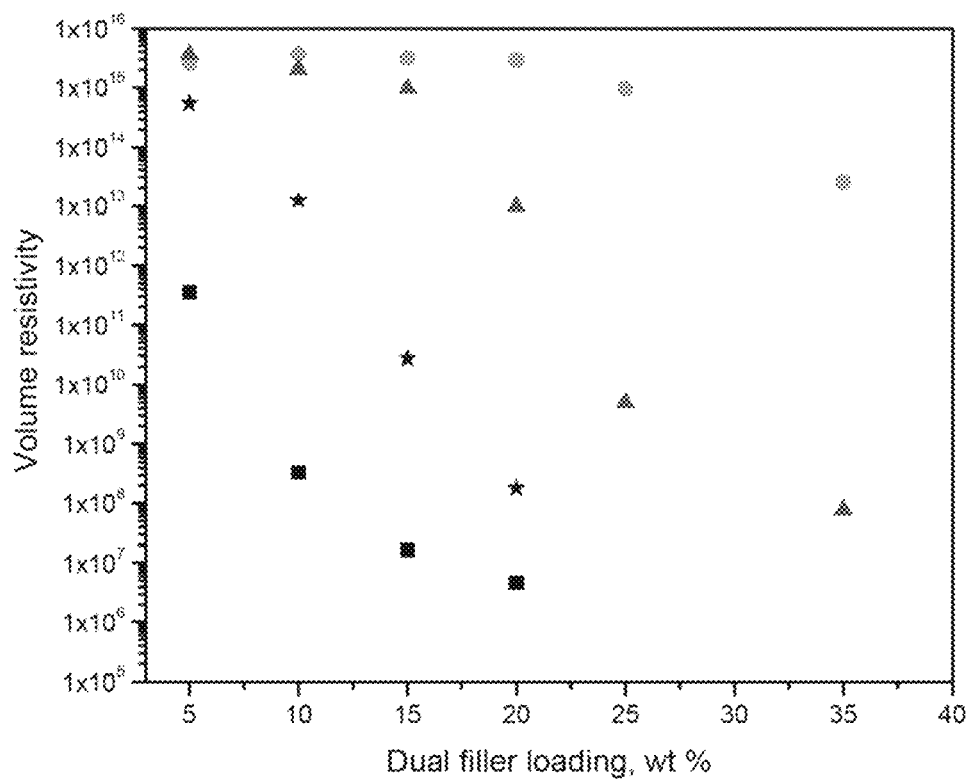
FIG. 9 is a graph showing the volume resistivity compared to filler loading of some of the dual phase fillers that are set forth in FIG. 8. Percolation curves for filler-polymer composites as a function of filler loading. Sulfur content on dual phase filler is about 300 ppm. Silica surface coverage as follow: ■—17%; ★—27%; ▲—38%; ●—73%.

As a specific example, a polymer composition can be formed comprising at least one polymer and at least one dual phase filler which has a total sulfur amount of about 10000 ppm or less, about 5000 ppm or less, 500 ppm or less and at least one platinum (Pt) curing catalyst. The polymer composition is preferably fully cured. At least one polymer can include or be a silicone polymer as described above. The polymer can be any one or more of the polymers as indicated above. As an option, the dual phase filler (in any embodiment or aspect of the present invention) can have attached at least one chemical group, such as one or more silanes, or one of more chemical groups that contain Si. The chemical group that optionally can be attached onto the dual phase filler can be by any attachment means, such as covalent bonding, absorption, hydrogen bonding, and the like. The dual phase filler can have any structure, for instance, the dual phase filler can have an OAN of about 200 cc/100 g filler or less, an OAN of 140 cc/100 g filler or less, an OAN of 60 to 140 cc/100 g filler, or an OAN of 141 to 200 cc/100 g filler, or any combination of various dual phase fillers having different OANs. It has been discovered that independently from silica surface coverage, using one or more dual phase fillers in a filler-polymer composition and wherein the dual phase filler has a sulfur content of 500 ppm or less, more preferably 1 ppm to 300 ppm, such as 5 ppm to 250 ppm, 10 ppm to 200 ppm, 15 ppm to 175 ppm, 20 ppm to 150 ppm, 30 ppm to 125 ppm, 50 ppm to 100 ppm, permits one to use a platinum curing catalyst and achieve full curing even if the polymer includes or is a silicone polymer. For instance, FIG. 9 shows percolation curves for filler-polymer composites as a function of filler loading, where the sulfur content is less than 300 ppm. With the use of low sulfur in the dual phase filler, there is no or minimal interference with the platinum curing agent and, therefore, one can achieve full curing of the silicone composite or composition. Thus, the present invention permits one to use platinum curing agents as opposed to peroxide curing agents, though the use of peroxide is an option for the curing agent.

Furthermore, it has been discovered that using one or more dual phase fillers in a filler-polymer composition and wherein the dual phase filler has a sulfur content of about 10000 ppm or less, or 5000 ppm or less, or about 3000 ppm or less, permits one to use a platinum curing catalyst and achieve full curing of silicone polymer. As indicated, when the silica surface coverage of the dual phase filler particles is above 50%, then the total sulfur level can be within or above these ranges (e.g., 1 ppm to 2.5 wt % total sulfur level). The silica phase substantially can reduce the amount of sulfur species on carbon black surface that platinum cross linking agent can effectively react with and therefore this invention permits preparing crosslinked silicone composites even using filler particles with the total sulfur level above 500 ppm. As a further example, the present invention relates to a polymer composition comprising at least one polymer and at least dual phase filler having an exposed outer surface area. The dual phase filler can have an OAN of 200 cc/100 g filler or less, an overall silica content of 30 wt % to 90 wt %, and the silica phase comprises from about 10% to about 90% by surface area of the exposed outer surface area. The OAN can be as indicated above. Similarly, various silica content ranges have been provided, and various exposed outer surface areas of silica phase have been provided and can be used herein. For purposes of the present invention and to avoid repetition, any of these various ranges can be used herein with respect to this exemplary polymer composition.

Furthermore, with the present invention, a filler-polymer composition can have an electrical resistivity, where the electrical resistivity changes an order of magnitude of 2 or less at a loading of from 5 to 35 wt % (based on the weight of the filler-polymer composition). The OAN number for the filler can be about 65 g/100 g filler or higher and can include any one of the OAN numbers provided earlier herein. This order of magnitude can be 2 or less, 1.7 or less, 1.5 or less, 1.4 or less, 1.2 or less, 1 or less, 0.8 or less, 0.6 or less, 0.4 or less, or 0.2 or less, such as from 0.1 to 2 or 0.5 to 1.5, and the like. The ability to maintain very consistent electrical resistivity across a range of loading levels (even when the loading of the filler is changed up to 35 wt %, for instance from 5 wt % to 35 wt % or more) offers significant advantages to end users when forming resistive filler-polymer compositions. Typically, different loading levels of the same filler can greatly change the resistivity of the overall filler-polymer composition. Because of this, end users were quite limited with respect to the amount of filler that could be present in the filler-polymer composition in order to stay within the desired resistivity of the final product. With some of the dual phase fillers of the present invention, it is possible to achieve fairly consistent electrical resistivity over a wide range of loadings of the filler. This is shown, for instance, in the upper part of FIG. 3 (acrylic composites), FIG. 5 (polystyrene composites), and FIG. 6 (polycarbonate composites), which had a very slight change in volume resistivity over various loading levels and on an order of magnitude of 2 or less. For instance, this can be achieved with dual phase fillers, such as ones having a silica phase surface coverage above 70%, above 80%, above 85%, from 80% to 95%, and the like. This can also be achieved with a combination of lower silica surface coverage and lower particle structure, for instance, as shown in FIG. 14. Therefore, this invention enables electrically resistive composites and compositions, for example, for insulative rubber parts, insulative adhesives and sealants formulations, electrically resistive black inks and paints, or for parts of various electronic components. In addition, as discussed above, there is an unmet need in the industry to have polymer composites with improved stability against UV and/or IR light and having high electrical resistivity. Carbon black is frequently used to improve reinforcing properties and UV/IR light stability. However, as shown in FIG. 3, resistivity of a composite based on a conventional carbon black decreased dramatically over the short range of carbon loading amount in the filler-polymer composite. The methods of the present invention overcome this problem by using/selecting a dual phase filler as described herein, and which can include ones with high silica surface coverage. For instance, it has been found that the silica surface coverage of about 50% or more or 80% or more was sufficient to maintain electrical resistivity over the broad range of filler concentration in the composite and achieve a change of electrical resistivity of less than a factor of 1 or 2 over the range of filler loading amount, such as from 1 wt % to 35 wt %. As an option, the steady electrical resistivity of the filler-polymer composition can even be substantially the same as the electrical resisitivity of the same polymer (in the filler-polymer composition) without any filler, and be less than an order of magnitude of 2 compared to the neat polymer (with no filler). This is particularly impressive given that a composite based on a conventional carbon black (with identical surface area and structure) percolated at filler concentrations of about 10 wt % and had a volume resistivity of about 9 orders of magnitude lower than that based on a dual phase filler and/or neat polymer. Thus, the present invention enables precise control of electrical resistivity in the composites even at varying filler loadings. Moreover, the present invention enables formulation of highly resistive composites with a wide range of filler amount.

With the present invention, any one or more of the conventional ingredients used in filler-polymer compositions can be used herein, for instance at the conventionally used amounts.

The filler-polymer compositions can be used to form a variety of end products or articles. For instance, the filler-polymer composition can be used to form toners. Further, an electrophoretic device can be formed containing polymer components made from the filler-polymer composition of the present invention. Inks and/or coatings containing at least one aqueous or non-aqueous carrier in the polymer composition of the present invention can be formed. Adhesives containing the polymer compositions of the present invention can be formed. An electrophotographic composite containing the polymer compositions of the present invention can be made. The electrophotographic composite can be a roll or belt. It is to be understood that, with respect to these various end use products or articles, the filler-polymer composition of the present invention can be used as the polymer component in one or more parts/components, and the remaining ingredients forming the various end use products or articles can be conventional components/ingredients/amounts known to those skilled in the art.

The dual phase fillers of this invention can be used in the same applications as conventional carbon blacks. More than one type of dual phase filler of the present invention can be used in any formulation, composition, or application.

Dual phase filler according to the invention can be used in a number of end use applications. These uses include, for example, plastic compositions, inks, toners, printing plates, electronic parts, packaging parts, coatings, rubber compositions, paper compositions, moldings, molding compositions, films, pipes, and textile compositions, and the other uses mentioned earlier or below.

The dual phase filler can be used with a variety of plastics including, but not limited to, plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) amino (melamine and urea); (4) epoxies; (5) phenolics; (6) polyesters; (7) silicones; and (8) urethanes.

Generally, the dual phase filler product is added like any other filler or pigment to the plastic used to form a plastic premix. This can be done, for example, in a dry mix or a melt stage. The dual phase filler of the invention may be used in combination with other conventional additives in plastic compositions. According to the invention, the term plastic composition includes, but is not limited to, any plastic material, article, goods, surface, fabric, sheet, and the like. For example, plastic materials include automotive parts, siding for homes, liners for swimming pools, roofing materials, packaging materials, and any variety of other household or industrial items.

The dual phase filler of this invention is also useful in ink formulations. Other ink additives may be incorporated into the ink formulation.

In general, an ink consists of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of aqueous inks, see The Printing Manual, 5th Ed., Leach et al, Eds. (Chapman and Hall, 1993). Various aqueous ink compositions are also disclosed, for example, in U.S. Pat. Nos. 2,833,736, 3,607,813, 4,104,833, 4,308,061, 4,770,706, and 5,026,755. As another example, flexographic inks represent a group of ink compositions. Flexographic inks generally include a colorant, a binder, and a solvent.

The dual phase filler of the invention, either as predispersion or as a solid, can be incorporated into an ink formulation using standard techniques.

The dual phase filler of the invention can be used in news inks. For example, an aqueous news ink composition may comprise water, the dual phase filler of the invention, a resin and conventional additives such as antifoam additives or a surfactant.

The dual phase filler of the invention may also be used in coating compositions such as paints or finishes. Other known aqueous coating additives may be incorporated the coating compositions. See, for example, MCGRAW-HILL ENCYCLOPEDIA OF SCIENCE & TECHNOLOGY, 5$^{th}$ Ed. (McGraw-Hill, 1982). See also U.S. Pat. Nos. 5,051,464; 5,319,044; 5,204,404; 5,051,464; 4,692,481; 5,356,973; 5,314,945; 5,266,406; and 5,266,361.

The dual phase filler of the invention may also be used in paper compositions. Accordingly, the invention relates to an improved paper product comprising paper pulp and a dual phase filler.

The paper products of the invention may incorporate other known paper additives such as sizing agents, retention aids, fixatives, fillers, defoamers, deflocculating agents, and the like.

The dual phase filler of the invention may also be used, as with conventional dual phase fillers, as pigments, fillers, and reinforcing agents in the compounding and preparation of rubber compositions.

Dual phase fillers of the present invention, for example, are useful in the preparation of rubber vulcanizates such as those in tires. It is generally desirable in the production of tires to utilize dual phase fillers which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed state. Tires with lower hysteresis values reduce rolling resistance and therefore are able to reduce the fuel consumption of the vehicle utilizing the tire. Thus, it is particularly desirable to have dual phase filler capable of imparting greater abrasion resistance and lower hysteresis in tires.

The dual phase filler of this invention may also be used to color fibers or textiles. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk and linen are used.

The dual phase filler of the present invention can be used to color fibers and textiles with, for example, direct and acid dyes. For a general discussion of coloring with dyes, see KIRK-OTHMER ENCYCLOPEDIA OF CHEMICAL TECHNOLOGY, Vol. 8, pp. 280-350, "Dyes, Application and Evaluation" (John Wiley and Sons, 1979).

With respect to toners or toner resins, suitable toner resins for use in the toner and developer compositions of the present invention include a styrenic polymer-based, such as a styrenated acrylic resin. Examples of preferred styrenic polymer-based resins include, but are not limited to, homopolymers and copolymers of styrene and its derivatives such as: polystyrene; poly-p-cholorostyrene; polyvinyltoluene; styrene-p-chlorostyrene copolymer; and styrene-vinyltoluene copolymer; copolymers of styrene and acrylic acid esters such as: styrenemethylacrylate copolymer; styrene-ethylacrylate copolymer; and styrene-n-butyl acrylate copolymer; copolymers of styrene and methacrylic acid esters such as: styrene-methyl methacrylate copolymer; styrene-ethyl methacrylate copolymer; styrene-n-butyl methacrylate copolymer; and multi-component copolymers of styrene, acrylic acid ester and methacrylic acid esters; copolymers of styrene and other vinyl monomers such as: styrene-acrylonitrile copolymer, styrene-methyl ether copolymer; styrene-butadienee copolymer; styrene-vinyl methyl ketone copolymer; styrene-acrylonitrileindene copolymer; styrene maleic acid ester copolymer; and the like. These binder resins may be used singly or in combination. Generally, resins particularly suitable for use in xerographic toner manufacturing have a melting point (ring and ball method) in the range of 100° C. to 135° C. and have a glass transition temperature (Tg) greater than about 60° C. Examples of styrenic polymer-based resin particles and suitable amounts can also be found in U.S. Pat. Nos. 5,278,018; 5,510,221; 5,275,900; 5,571,654; 5,484,575; and EP 0 720 066 A1, all incorporated in their entirety by reference herein.

Generally, the dual phase filler of the present invention, alone or with other pigments, is present in total amounts of from about 1% by weight to about 30% by weight of the toner or developer composition. The amount of pigment present in the toner composition is preferably from about 0.1 to about 12 wt parts per 100 wt parts of resin. However, lesser or greater amounts of the dual phase filler may be used. Also, generally, the toner resin is present in amounts of from about 60% by weight to about 99% by weight of the toner or developer composition.

Optional external additives may also be mixed or blended with the toner compositions of the present invention including carrier additives; additional positive or negative charge controlling agents such as quaternary ammonium salts, pyridinum salts, sulfates, phosphates, and carboxylates; flow aid additives; silicone oils; waxes such as commercially available polypropylenes and polyethylenes; magnetite; and other known additives. Generally, these additives are present in amounts of from about 0.05% by weight to about 30% by weight, however, lesser or greater amounts of the additives may be selected depending on the particular system and desired properties. Specific examples of additives and amounts are also described in the patents and the European patent application mentioned above and incorporated herein by reference.

The toner compositions can be prepared by a number of known methods, such as admixing and heating the resin, the dual phase filler particles, optional charge enhancing additives and other additives in conventional melt extrusion devices and related equipment. Other methods include spray drying and the like. Compounding of the dual phase filler and other ingredients with the resin is generally followed by mechanical attrition and classification to provide toner particles having a desired particle size and particle size distribution. Conventional equipment for dry blending of powders may be used for mixing or blending the dual phase filler particles with the resin. Again, conventional methods of preparing toner and developer compositions can be used and are described in the patents and European application described above and incorporated herein by reference.

In more detail, the toner material can be prepared by dry blending the binder resin with all other ingredients, including the pigment, and then melt-extruding in a high shear mixer to form a homogeneously mixed mass. During this process the components are held at a temperature above the melting point of the binder resin, and those components that are insoluble in the resin are ground so that their average particle size is reduced. This homogeneously mixed mass is then allowed to cool and solidify, after which it is pre-ground to an average particle size of about 100 microns. This material is then further subjected to particle size reduction until its average particle size meets the size range specification required for classification. A variety of classifying techniques may be used. The preferred type is an air classification type. By this method, particles in the ground material which are too large or too small are segregated from the portion of the material which is of the desired particle size range.

The toner composition of the present invention may be used alone in monocomponent developers or may be mixed with suitable carrier particles to form dual component developers. The carrier vehicles which can be used to form dual component developer compositions can be selected from various materials. Such materials typically include carrier core particles and core particles overcoated with a thin layer of film-forming resin to help establish the correct triboelectric relationship and charge level with the toner employed. Suitable carriers for two component toner compositions include iron powder, glass beads, crystals of inorganic salts, ferrite powder, nickel powder, all of which are typically coated with resin coating such as an epoxy or fluorocarbon resin. Examples of carrier particles and coatings that can be used and are described in the patents and European application described above and incorporated herein by reference.

The present invention is further directed to a method of imaging which includes formulating an electrostatic latent image on a negatively charged photoconductive imaging member, affecting the development thereof with toner composition comprising resin particles and dual phase filler particles, and thereafter transferring the developed image onto a suitable substrate. Conventional methods of imaging can be used, such as shown in the patents and European patent application described above.

The dual phase fillers of the present invention can also be used as a component in molding, films, or pipes. Conventional formulations can be used but wherein the dual phase filler of the present invention is present instead of conventional carbon black.

With the present invention, the dual phase fillers permit one to achieve new performances, based particularly for resistivity control applications. The present invention and the use of the dual phase fillers can provide significant advantages for various applications, such as elastomers, energy dissipation materials, insulators with improved UV/IR light protection characteristics, electrophotographic composites (rolls and belts), non-conductive black inks, gaskets, adhesives for electronics, toners, electrophoretic devices, and other uses. The dual phase fillers can be charged with conventional charge control agents in oil or other mediums and can be used as an electrophoretic image-forming particle in electrophoretic devices and/or displays. The exposed surface area that is silica and particularly high amounts of this exposed surface area that is silica, provides more uniform and controlled charging of the particles, which is important for performance of electrophoretic displays.

The present invention includes the following aspects/embodiments/features in any order and/or in any combination:

1. The present invention relates to a method to control electrical resistivity in a filler-polymer composition comprising:
   combining at least one polymer with at least one filler, said filler comprising:
   a) a controlled amount of a dual phase filler having a silica phase and a carbon phase, or
   b) a dual phase filler having a silica phase and a carbon phase, wherein said silica phase is a controlled surface coverage amount of the silica phase, or
   c) a dual phase filler having a silica phase and a carbon phase, wherein said dual phase filler has a controlled morphology; or
   d) any combination of a), b), and c).

2. The method of any preceding or following embodiment/feature/aspect, wherein the dual phase filler comprises fused primary particles with an average aggregate size of less than 250 nm and an average primary particle size of 45 nm or less.

3. The method of any preceding or following embodiment/feature/aspect, wherein dual phase filler has less than 1% weight loss when subjected to the temperature from 120° C. up to 450° C. in air with a temperature ramp of 5 deg C. per minute.

4. The method of any preceding or following embodiment/feature/aspect, wherein said electrical resistivity of said filler-polymer composition is maintained upon thermal processing or post-processing of said filler-polymer composition at temperatures up to thermal stability of said at least one polymer.

5. The method of any preceding or following embodiment/feature/aspect, wherein said electrical resistivity of said filler-polymer composition is maintained upon thermal processing or post-processing of said filler-polymer composition at temperatures up to at least 450 deg. C.

6. The method of any preceding or following embodiment/feature/aspect, wherein said controlled amount is an amount selected from 1 wt % filler loading to 40 wt % filler loading, wherein a higher filler loading provides a lower volume resistivity in said filler-polymer composition.

7. The method of any preceding or following embodiment/feature/aspect, wherein said controlled surface coverage amount of the silica phase is from about 5% of the exposed surface area to about 90% of the exposed surface area, and wherein a higher controlled surface coverage amount provides a higher electrical resistivity in said filler-polymer composition.

8. The method of any preceding or following embodiment/feature/aspect, wherein said controlled morphology is an iodine number or an OAN, and wherein a higher iodine number or OAN contributes to a lower volume resistivity.

9. The method of any preceding or following embodiment/feature/aspect, wherein said dual phase filler has any sulfur content when the silica surface coverage is above 50%.

10. The method of any preceding or following embodiment/feature/aspect, wherein said dual phase filler has a sulfur content of 500 ppm or less.

11. The method of any preceding or following embodiment/feature/aspect, wherein said dual phase filler has a sulfur content of from 1 ppm to 100 ppm.

12. The method of any preceding or following embodiment/feature/aspect, wherein said silica phase is present in an amount of 30 wt % to about 90 wt % based on the weight of the dual phase filler.

13. The method of any preceding or following embodiment/feature/aspect, wherein said dual phase filler has attached at least one chemical group.

14. The method of any preceding or following embodiment/feature/aspect, wherein said dual phase filler has attached at least one silane.

15. A polymer composition comprising at least one silicone polymer and a dual phase filler having a silica phase and a carbon phase, wherein said dual phase filler has an exposed outer surface area, and said silica phase comprises from about 10% to about 90% by surface area of said exposed outer surface area.

16. The polymer composition of any preceding or following embodiment/feature/aspect, wherein said exposed outer surface area is 20% to 85% by surface area of said exposed outer surface area.

17. The polymer composition of any preceding or following embodiment/feature/aspect, wherein said exposed outer surface area is 30% to 80% by surface area of said exposed outer surface area.

18. The polymer composition of any preceding or following embodiment/feature/aspect, wherein said exposed outer surface area is 30% to 70% by surface area of said exposed outer surface area.

19. The polymer composition of any preceding or following embodiment/feature/aspect, wherein said silicone polymer is at least one polydimethyl siloxane.

20. The polymer composition of any preceding or following embodiment/feature/aspect, wherein said polymer composition has a W-adhesion of filler to polymer for said polymer composition of 110 mJ/m$^2$ or higher.

21. The polymer composition of any preceding or following embodiment/feature/aspect, wherein said W-adhesion is 120 to 150 mJ/m$^2$.

22. A polymer composition comprising:
   a) at least one polymer;
   b) at least one dual phase filler comprising a silica phase and a carbon phase having a sulfur amount of 500 ppm or less; and
   c) at least one Pt curing catalyst.

23. The polymer composition of any preceding or following embodiment/feature/aspect, wherein said polymer composition is fully cured.

24. The polymer composition of any preceding or following embodiment/feature/aspect, wherein said at least one polymer is a silicone polymer.

25. The polymer composition of any preceding or following embodiment/feature/aspect, wherein said dual phase filler has attached at least one chemical group.

26. The polymer composition of any preceding or following embodiment/feature/aspect, wherein said at least one chemical group is a silane.

27. The polymer composition of any preceding or following embodiment/feature/aspect, wherein said dual phase filler has an OAN of 140 cc/100 g filler or less.

28. The polymer composition of any preceding or following embodiment/feature/aspect, wherein said dual phase filler has an OAN of 60 to 140 cc/100 g filler or less.

29. The polymer composition of any preceding or following embodiment/feature/aspect, wherein said dual phase filler has an OAN of 141 to about 200 cc/100 g filler.

30. A polymer composition comprising:
   a) at least one polymer;
   b) at least one dual phase filler comprising a silica phase and a carbon phase having a sulfur amount of about 10000 or less; and
   c) at least one Pt curing catalyst.

31. A polymer composition comprising:
   a) at least one polymer; and b) at least one dual phase filler having an exposed outer surface area, wherein said dual phase filler has an OAN of 200 cc/100 g filler or less, a silica content of 25 wt % to 90 wt %, and said silica phase comprises from about 10% to about 90% by surface area of said exposed outer surface area.

32. A polymer composition having an electrical resistivity comprising:
   a) at least one polymer; and
   b) at least one dual phase filler having an exposed outer surface area, wherein said dual phase filler has an OAN of from about 65 to about 200 cc/100 g filler, a silica content of 25 wt % to 90 wt %, and said silica phase comprises from about 10% to about 90% by surface area of said exposed outer surface area, where the electrical resistivity changes an order of magnitude of 2 or less over loading levels from 5 wt % to 35 wt % in the polymer composition.

33. The polymer composition of any preceding or following embodiment/feature/aspect, wherein the electrical resistivity of said polymer composition and electrical resistivity of a polymer composition with said at least one polymer without any filler changes an order of magnitude 2 or less over said loading levels.

34. A toner comprising the polymer composition of any preceding or following embodiment/feature/aspect.

35. An electrophoretic device comprising the polymer composition of any preceding or following embodiment/feature/aspect.

36. An ink comprising at least one aqueous or non-aqueous carrier and the polymer composition of any preceding or following embodiment/feature/aspect.

37. An adhesive comprising the polymer composition of any preceding or following embodiment/feature/aspect.

38. A sealant comprising the polymer composition of any preceding or following embodiment/feature/aspect.

39. An electrophotographic composite comprising the polymer composition of any preceding or following embodiment/feature/aspect.

40. The electrophotographic composite of any preceding or following embodiment/feature/aspect, wherein said electrophotographic composite is a roll or belt.

41. A method to control impedance, dielectric constant, and dielectric loss (tan $\delta$) in a filler-polymer composition comprising:
   combining at least one polymer with at least one filler, said filler comprising:
   a) a controlled amount of a dual phase filler having a silica phase and a carbon phase, or
   b) a dual phase filler having a silica phase and a carbon phase, wherein said silica phase is a controlled surface coverage amount of the silica phase, or
   c) a dual phase filler having a silica phase and a carbon phase, wherein said dual phase filler has a controlled morphology; or
   d) any combination of a), b), and c).

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention.

Example 1

Electrical properties of dual phase fillers were tested in a polymer composition to show the effects of silica content and silica distribution. Compounding of polycarbonate, polystyrene, and polyethylene with dual phase particles was performed by using of a Brabender mixer (Type: 08-13-000) operating at a temperature above the melting temperature of the corresponding polymers (for example 160° C. for polystyrene and 300° C. for polycarbonate). The polystyrene had an average MW of 350000 and was from Sigma Aldrich; the polycarbonate had a melt flow index of 17.5 and was from Sabic. In the various trials, as shown in FIGS. 5 and 6, different dual phase fillers with different silica phase surface coverage were used in separate experiments.

After the slow addition of a specified amount of the particular dual phase particles to the melted polymer in the mixer, the mixture was mixed for 30 min and then discharged. Films were prepared by hot-pressing of polymer-particle composite samples in a mold between two mylar or two kapton release liner sheets and steel plates. Samples were pressed at 10 kPa. Surface and volume resistivity of the particle-polymer composite films were measured using a Keithley electrometer with the Keithley 8009 resistivity test fixtures. FIGS. 5 and 6 show electrical percolation curves for the obtained particle-polymer composites. As can be seen, resistivity can be controlled based on either the amount of silica phase surface coverage and/or particle loading.

Example 2

Several acrylic formulations were prepared to evaluate electrical properties and ability to tune the electrical properties of the acrylic-based films with various dual phase particles. As in Example 1, different dual phase fillers with different silica phase surface coverage were used in separate experiments.

For each filler sample, polymer composites were prepared with acrylic resin NeoCryl B-814 from DSM NeoResins.

Solvent dispersions (mill bases) were prepared in Scandex paint shaker. Let down dispersion were coated on steel Q-plates with a 3 mil draw down bar. Films were initially air-dried in a hood, followed by oven drying at 120° C. The final films had a thickness of 10-30 µm.

Volume and resistivity measurements were obtained according to the procedure described in ASTM D257-93 using a Keithley 6517 Electrometer equipped with ETS resistance probe 803B. The voltage for measuring resistance was 5V. Surface resistivity values were taken directly from the computer.

FIG. 3 depicts surface electrical resistivity of the obtained acrylic films and demonstrates the capability of the method proposed herein to make films with the targeted electrical resistivity independently from the loading of the particles. In other words, the amount of silica phase surface coverage on the filler controlled resistivity.

Example 3

Figure 10:
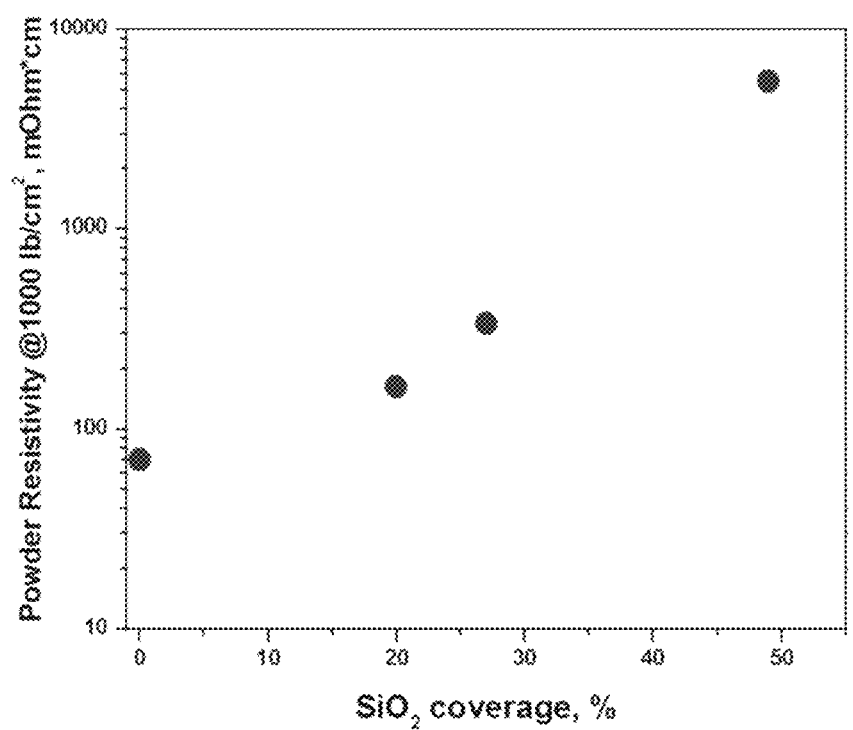
FIG. 10 is a graph showing the powder resistivity for dual phase fillers with different silica phase coverage. Powder resistivity of dual phase particles compressed and measured at 1000 lb/cm$^2$ pressure was measured.
Figure 12:
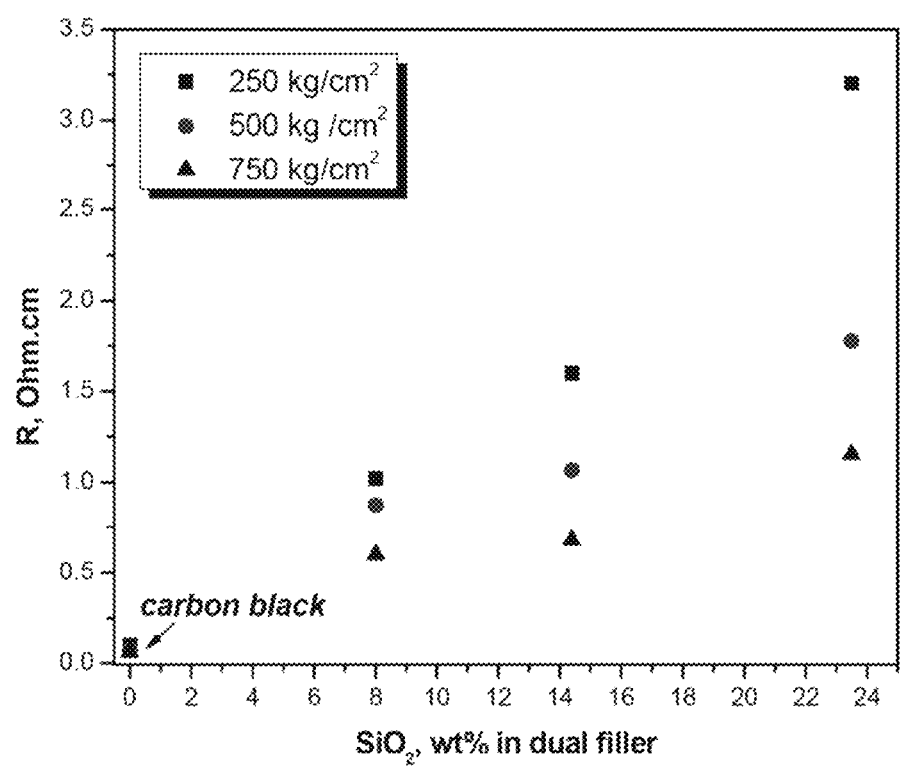
FIG. 12 is a graph showing the powder resistance for dual phase fillers with various concentrations of silica. Powder resistance for dual phase fillers are shown with various concentrations of silica; VXC-72 carbon black is included as a reference.

Powder resistivity of the dual phase particles was measured using method and setup described by Espinola et al. *Carbon* Vol 24, No. 3, pp. 337-341, 1986. Dual phase carbon-silica materials were pressed between two brass pistols in a polyethylene chamber with diameter 11.3 mm. The resistivity of the powder was measured at different applied pressure ranging from 200 to 1500 lbs/cm$^2$ with 100 lbs/cm$^2$ increment. FIG. 10 depicts the powder resistance of dried dual phase filler particles pressed at different pressures as a function of silica surface content in the filler. These results were compared to conventional VXC-72 carbon black as shown in FIG. 12. FIG. 12 also shows the effects of varying the silica content anywhere in the filler. As shown in FIGS. 10 and 12, the electrical properties of the dual phase filler can be tuned by adjusting silica content (or exposed surface coverage) of the material.

Example 4

Figure 13:
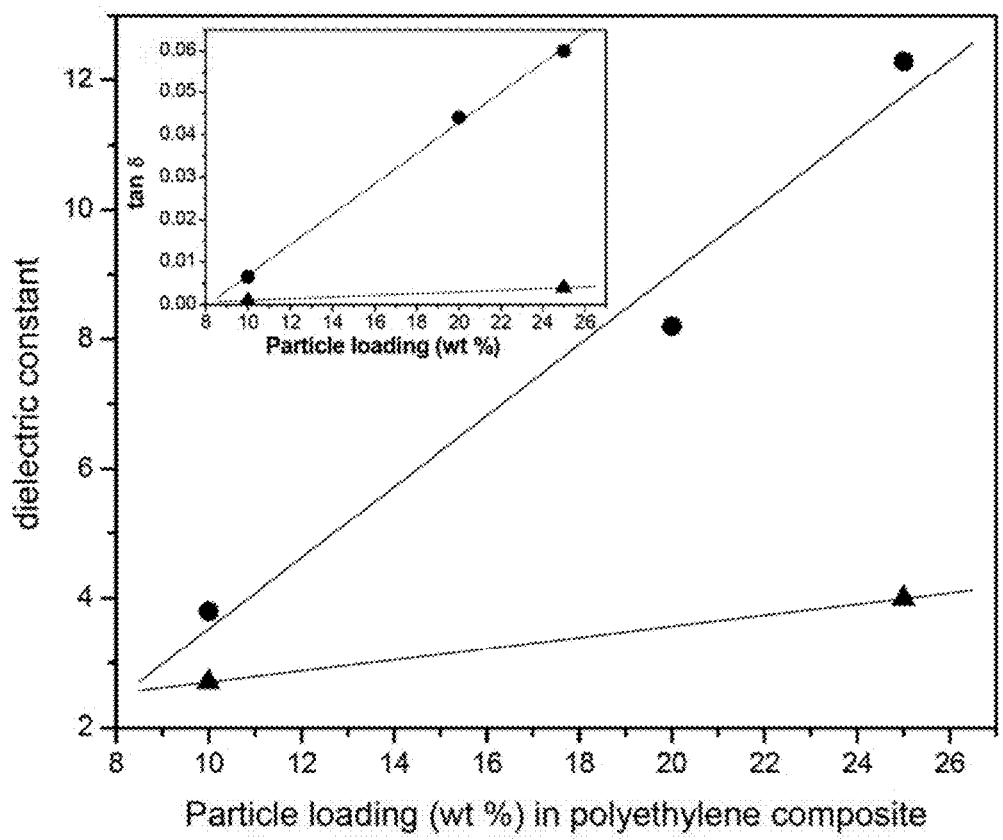
FIG. 13 is a graph showing the dielectric constant and tan δ measured at 1 Hz for polyethylene-filled base composites containing various types of dual phase filler. Dielectric constant and dielectric loss tangent (tan δ) measured at 1 Hz for polyethylene filled based composites with dual phase particles are shown: •—50% silica surface coverage; ▲—85% silica surface coverage.

In this example, the dielectric constant and tan δ were measured for two fillers with different exposed surface area amounts of the silica phase. The fillers had nearly identical morphology but for the different silica phase content on the surface. In this example and the results are shown in FIG. 13, the dielectric constant and tan δ measured for two different dual phase fillers dispersed in polyethylene at several loadings were measured, and, as can be seen, the dielectric constant and tan δ can be controlled based on filler loading, as well as the amount of exposed silica phase on the surface of the dual phase filler.

Example 5

Figure 15:
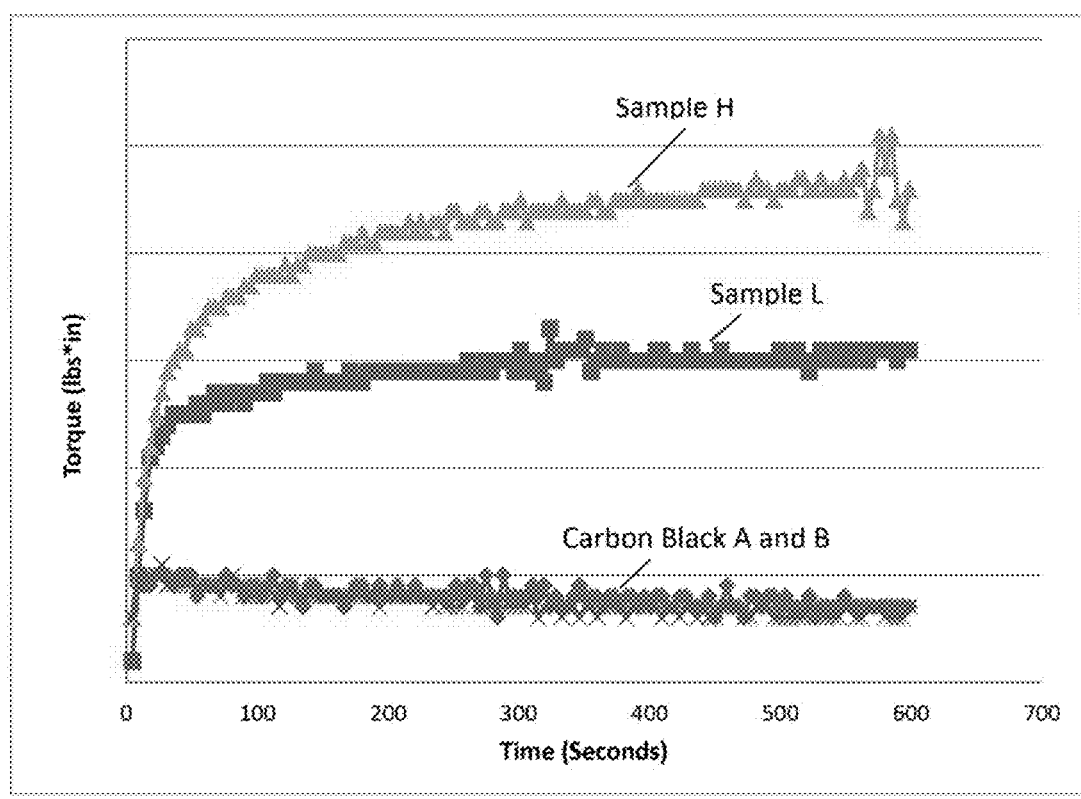
FIG. 15 is a MDR curing profile for carbon black and for two types of dual phase filler. A MDR curing profile is shown for silicone composition that contains either carbon black (Carbon Black A and B) or dual phase filler (Sample L and H) at 15 wt % of particles.

In this example, silicone formulations were prepared with the dual phase particles to demonstrate the advantages of using them over the conventional carbon black material in the preparation and curing of silicone formulations with platinum-based catalyst. The base was prepared by mixing dual phase particles with vinyl terminated polydimethylsiloxane (3500 cSt, Gelest Inc), in the SpeedMixer® at 3000 rpm. Part A of the silicone curing formulation was prepared by mixing 30 g of the base with 0.9 g (25-30% Methylhydrosiloxane)—Dimethylsiloxane Copolymer, Trimethylsiloxane Terminated (25-35 cSt, Gilest Inc). Part B consisted of 30 g base that was mixed with 20 ppm Platinum—Divinyltetramethyldisiloxane Complex (3-3.5% platinum concentration, Gilest Inc). Part A and B were placed in an adhesive duo-pak cartridge (consisting of two separate syringes) that was conditioned in the oven at 70° C. for 6 hours. Silicone curing was initiated by mixing both parts at 1:1 ratio utilizing a duo-pak mixing gun with a static mixer. The final mixture was then heated to 70° C. and inspected visually with spatula. Separately, curing of various silicone formulations with dual phase particles (Sample L or H) was characterized in moving die rheometer (MDR) at 150° C. for 10 min. Results of MDR testing and visual inspection are summarized in Table 2 below and FIG. 15.

TABLE 2

| Sample ID | $SiO_2$, wt % | $I_2$# | BET $m^2/g$ | STSA $m^2/g$ | OAN, ml/100 g | $SiO_2$ Coverage, % | total sulfur, % | Cured? |
|---|---|---|---|---|---|---|---|---|
| L | 47.4 | 34.9 | 144.9 | 110.6 | 187.5 | 73 | 0.04 | YES |
| H | 47.9 | 14.0 | 145.7 | 113.0 | 149.8 | 90 | 0.3 | YES |
| Carbon Black A | 0 | 120.0 | 119.0 | 112.0 | 125.0 | n/a | 0.37 | NO |
| Carbon Black B | 0 | 142.0 | 143.0 | 137.0 | 128.0 | n/a | 1.1 | NO |

As seen, curing of silicone was not effective when conventional carbon black samples were used. Silicone formulations based on dual phase particles did cure in the presence of a Pt catalyst. Dual phase fillers with low total sulfur content or dual phase particles with high silica surface coverage were effective in curing silicones and therefore preparing cured silicone composites.

In another example, a thermogravimetric study was conducted on a carbon black, oxidized carbon black and a dual phase filler having about 85% surface area that is a silica phase. FIG. 11 depicts the results of thermogravimetric analysis in the presence of air. As can be seen, the oxidized carbon black started losing weight as early as 200 deg C. with the steep acceleration of weight loss (burning) at about 500 deg C., conventional carbon black was stable up to about 500 deg C. followed by the steep weight loss, whereas dual phase particles were thermally stable at a variety of high temperatures, include 300 deg C., 450 deg C., and at least 550 deg C. The point for steep acceleration of weight loss for dual phase particle was at about 600 deg C.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to control electrical resistivity in a filler-polymer composition comprising:
   combining at least one polymer with at least one filler, said filler comprising:
   a) a controlled amount of a dual phase filler having a silica phase and a carbon phase, wherein said controlled amount is an amount selected from 1 wt % filler loading to 40 wt % filler loading, wherein a higher filler loading provides a lower volume resistivity in said filler-polymer composition; or
   b) a dual phase filler having a silica phase and a carbon phase, wherein said silica phase is a controlled surface coverage amount of the silica phase, wherein said controlled surface coverage amount of the silica phase is from about 5% of the exposed surface area to about 90% of the exposed surface area, and wherein a higher controlled surface coverage amount provides a higher electrical resistivity in said filler-polymer composition; or
   c) a dual phase filler having a silica phase and a carbon phase, wherein said dual phase filler has a controlled morphology wherein said controlled morphology is an iodine number or an OAN, and wherein a higher iodine number or OAN contributes to a lower volume resistivity; or d) any combination of a), b), and c), wherein the dual phase filler of a), b), and c) contains a silica content of from 10 wt % to 90 wt %, based on weight of the dual phase filler, and the dual phase filler comprises fused primary particles with an average aggregate size of less than 250 nm and an average primary particle size of 45 nm or less, or the dual phase filler has less than 1% weight loss when subjected to the temperature from 120° C. up to 450° C. in air with a temperature ramp of 5° C. per minute.

2. The method of claim 1, wherein said electrical resistivity of said filler-polymer composition is maintained upon thermal processing or post-processing of said filler-polymer composition at temperatures up to thermal stability of said at least one polymer.

3. The method of claim 1, wherein said dual phase filler has a total sulfur content of 10000 ppm or less.

4. A method to control impedance, dielectric constant, and dielectric loss (tan δ) in a filler-polymer composition comprising:

combining at least one polymer with at least one filler, said filler comprising:

a) a controlled amount of a dual phase filler having a silica phase and a carbon phase, wherein said controlled amount is an amount selected from 1 wt % filler loading to 40 wt % filler loading, wherein a higher filler loading provides a lower volume resistivity in said filler-polymer composition; or b) a dual phase filler having a silica phase and a carbon phase, wherein said silica phase is a controlled surface coverage amount of the silica phase, wherein said controlled surface coverage amount of the silica phase is from about 5% of the exposed surface area to about 90% of the exposed surface area, and wherein a higher controlled surface coverage amount provides a higher electrical resistivity in said filler-polymer composition; or c) a dual phase filler having a silica phase and a carbon phase, wherein said dual phase filler has a controlled morphology wherein said controlled morphology is an iodine number or an OAN, and wherein a higher iodine number or OAN contributes to a lower volume resistivity; or d) any combination of a), b), and c), wherein the dual phase filler of a), b), and c) contains a silica content of from 10 wt % to 90 wt %, based on weight of the dual phase filler, and the dual phase filler comprises fused primary particles with an average aggregate size of less than 250 nm and an average primary particle size of 45 nm or less, or the dual phase filler has less than 1% weight loss when subjected to the temperature from 120° C. up to 450° C. in air with a temperature ramp of 5° C. per minute.

* * * * *